United States Patent
Sridhara et al.

(10) Patent No.: US 10,089,459 B2
(45) Date of Patent: *Oct. 2, 2018

(54) MALWARE DETECTION AND PREVENTION BY MONITORING AND MODIFYING A HARDWARE PIPELINE

(71) Applicant: QUALCOMM Incorporated, San Diego, CA (US)

(72) Inventors: Vinay Sridhara, Santa Clara, CA (US); Satyajit Prabhakar Patne, San Diego, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 14/938,212

(22) Filed: Nov. 11, 2015

(65) Prior Publication Data
US 2016/0063243 A1    Mar. 3, 2016

Related U.S. Application Data

(63) Continuation of application No. 14/044,956, filed on Oct. 3, 2013, now Pat. No. 9,213,831.

(51) Int. Cl.
*G06F 21/55* (2013.01)
*G06F 21/57* (2013.01)
(Continued)

(52) U.S. Cl.
CPC .......... *G06F 21/55* (2013.01); *G06F 9/30145* (2013.01); *G06F 9/3861* (2013.01);
(Continued)

(58) Field of Classification Search
CPC ........ G06F 21/125; G06F 21/52; G06F 21/54; G06F 21/566; G06F 11/3612
See application file for complete search history.

(56) References Cited

U.S. PATENT DOCUMENTS

| 7,024,548 B1 | 4/2006 | O'Toole, Jr. |
| 7,028,338 B1 | 4/2006 | Norris et al. |

(Continued)

FOREIGN PATENT DOCUMENTS

| CN | 101479709 A | 7/2009 |
| CN | 101483658 A | 7/2009 |

(Continued)

OTHER PUBLICATIONS

Zhang et al.; Practical Control Flow Integrity & Randomization for Binary Executables; 2013; Retrieved from the Internet <URL: http://ieeexplore.ieee.org/abstract/document/6547133/>; pp. 1-15, as printed.*

(Continued)

*Primary Examiner* — Saleh Najjar
*Assistant Examiner* — Michael W Chao
(74) *Attorney, Agent, or Firm* — Jae-Hee Choi; The Marbury Law Group

(57) ABSTRACT

The various aspects provide a method for recognizing and preventing malicious behavior on a mobile computing device before it occurs by monitoring and modifying instructions pending in the mobile computing device's hardware pipeline (i.e., queued instructions). In the various aspects, a mobile computing device may preemptively determine whether executing a set of queued instructions will result in a malicious configuration given the mobile computing device's current configuration. When the mobile computing device determines that executing the queued instructions will result in a malicious configuration, the mobile computing device may stop execution of the queued instructions or take other actions to preempt the malicious behavior before the queued instructions are executed.

28 Claims, 14 Drawing Sheets

(51) Int. Cl.
| | |
|---|---|
| *G06F 9/30* | (2018.01) |
| *G06F 21/52* | (2013.01) |
| *G06F 21/12* | (2013.01) |
| *G06F 11/36* | (2006.01) |
| *G06F 21/54* | (2013.01) |
| *G06F 21/56* | (2013.01) |
| *H04L 29/06* | (2006.01) |
| *H04W 12/12* | (2009.01) |
| *G06F 9/38* | (2018.01) |

(52) U.S. Cl.
CPC ........ *G06F 11/3612* (2013.01); *G06F 21/125* (2013.01); *G06F 21/52* (2013.01); *G06F 21/54* (2013.01); *G06F 21/566* (2013.01); *G06F 21/577* (2013.01); *H04L 63/145* (2013.01); *H04L 63/1425* (2013.01); *H04L 63/1433* (2013.01); *H04W 12/12* (2013.01)

(56) References Cited

U.S. PATENT DOCUMENTS

| | | | |
|---|---|---|---|
| 7,257,523 B1 | 8/2007 | Nixon et al. | |
| 7,287,283 B1* | 10/2007 | Szor | G06F 21/52 713/165 |
| 7,370,360 B2 | 5/2008 | Van Der Made et al. | |
| 7,657,941 B1* | 2/2010 | Zaitsev | G06F 21/567 380/59 |
| 7,774,843 B1 | 8/2010 | Prakash | |
| 7,827,612 B2 | 11/2010 | Saito | |
| 8,201,246 B1 | 6/2012 | Wu et al. | |
| 8,365,286 B2 | 1/2013 | Poston | |
| 8,375,450 B1 | 2/2013 | Oliver et al. | |
| 8,464,345 B2 | 6/2013 | Satish et al. | |
| 8,474,039 B2* | 6/2013 | Sallam | G06F 21/566 726/22 |
| 8,955,111 B2* | 2/2015 | Glew | G06F 21/552 726/22 |
| 9,021,589 B2* | 4/2015 | Anderson | G06F 21/566 709/206 |
| 9,213,831 B2 | 12/2015 | Sridhara et al. | |
| 9,460,290 B2* | 10/2016 | Glew | G06F 21/577 |
| 9,779,235 B2* | 10/2017 | Mertoguno | G06F 21/55 |
| 2005/0015667 A1 | 1/2005 | Aaron | |
| 2005/0038827 A1 | 2/2005 | Hooks | |
| 2006/0025962 A1 | 2/2006 | Ma et al. | |
| 2006/0075494 A1 | 4/2006 | Bertman et al. | |
| 2006/0278694 A1 | 12/2006 | Jha et al. | |
| 2007/0240222 A1* | 10/2007 | Tuvell | G06F 21/56 726/24 |
| 2008/0086773 A1 | 4/2008 | Tuvell et al. | |
| 2009/0248497 A1 | 10/2009 | Hueter | |
| 2009/0271863 A1 | 10/2009 | Govindavajhala et al. | |
| 2009/0320136 A1 | 12/2009 | Lambert et al. | |
| 2010/0077481 A1 | 3/2010 | Polyakov et al. | |
| 2011/0214161 A1 | 9/2011 | Stolfo et al. | |
| 2012/0042375 A1* | 2/2012 | Yoo | G06F 21/55 726/13 |
| 2012/0137369 A1 | 5/2012 | Shin et al. | |
| 2012/0159629 A1 | 6/2012 | Lee et al. | |
| 2012/0210423 A1 | 8/2012 | Friedrichs et al. | |
| 2013/0042115 A1 | 2/2013 | Sweet et al. | |
| 2013/0091570 A1 | 4/2013 | McCorkendale et al. | |
| 2013/0097660 A1 | 4/2013 | Das et al. | |
| 2013/0097706 A1 | 4/2013 | Titonis et al. | |
| 2013/0311385 A1 | 11/2013 | Foreman | |
| 2013/0340081 A1 | 12/2013 | Sakthikumar et al. | |
| 2013/0347094 A1 | 12/2013 | Bettini et al. | |
| 2014/0075556 A1* | 3/2014 | Wicherski | G06F 21/554 726/23 |
| 2014/0123286 A1* | 5/2014 | Fischer | G06F 21/566 726/23 |
| 2014/0173734 A1* | 6/2014 | Keromytis | G06F 11/08 726/23 |
| 2014/0201732 A1 | 7/2014 | Haag et al. | |
| 2014/0259167 A1 | 9/2014 | Babu et al. | |
| 2014/0325616 A1 | 10/2014 | Dolph et al. | |
| 2015/0101047 A1* | 4/2015 | Sridhara | G06F 21/55 726/23 |
| 2015/0101048 A1* | 4/2015 | Sridhara | G06F 21/55 726/23 |
| 2015/0264087 A1* | 9/2015 | Lal | H04L 63/20 726/1 |
| 2016/0110269 A1* | 4/2016 | Sahita | G06F 21/53 714/38.11 |
| 2016/0210069 A1* | 7/2016 | Lutas | G06F 3/0622 |
| 2016/0275288 A1* | 9/2016 | Sethumadhavan | G06F 21/566 |
| 2016/0328561 A1* | 11/2016 | Tamir | G06F 21/566 |

FOREIGN PATENT DOCUMENTS

| | | |
|---|---|---|
| EP | 1619572 A1 | 1/2006 |
| JP | 2001034596 A | 2/2001 |
| JP | 2002251374 A | 9/2002 |
| JP | 2005136526 A | 5/2005 |
| JP | 2005341217 A | 12/2005 |
| JP | 2007018044 A | 1/2007 |
| WO | 2007007326 A2 | 1/2007 |
| WO | 2013142228 A1 | 9/2013 |

OTHER PUBLICATIONS

Chouchane et al.; Detecting machine-morphed malware variants via engine attribution; 2013; Retrieved from the Internet <URL: https://link.springer.com/article/10.1007/s11416-013-0183-6>; pp. 1-21 as printed.*

International Search Report and Written Opinion—PCT/US2014/056666—ISA/EPO—dated Dec. 12, 2014.

International Search Report and Written Opinion—PCT/US2014/056670—ISA/EPO—Dec. 10, 2014.

Jemal R., "Chapter 2 : The 8086 Processor Architecture", Mar. 4, 2011 (Mar. 4, 2011), pp. 1-28, XP055155473, Retrieved from the Internet: URL:http://faculty.ksu.edu.sa/djemal/EE353/EE353Chap2-1.0.pdf [retrieved on Nov. 27, 2014] p. 8-p. 11.

Kayaalp., et al., "SCRAP: Architecture for Signature-Based Protection from Code Reuse Attacks", Feb. 2013; Internet URL: ieeexplore.ieee.org/xpls/abs_all.jsp?arnumber=6522324&tag=1, pp. 1-12 as printed.

Shi., et al., "Augmenting Branch Predictor to Secure Program Execution", 2007, Retrieved from the Internet URL: ieeexplore.ieee.org/xpls/icp.jsp?arnumber=4272951, pp. 1-10 as printed.

* cited by examiner

MALWARE DETECTION AND PREVENTION BY MONITORING AND MODIFYING A HARDWARE PIPELINE

RELATED APPLICATIONS

This application is a continuation U.S. patent application Ser. No. 14/044,956 entitled "Malware Detection and Prevention by Monitoring and Modifying a Hardware Pipeline" filed on Oct. 3, 2013, which is related to U.S. patent application Ser. No. 14/044,937 entitled "Pre-Identifying Probable Malicious Behavior Based on Configuration Pathways," the contents of both of which are hereby incorporated by reference in their entirety.

BACKGROUND

Generally, the performance and power efficiency of a mobile computing device degrade over time. Anti-virus companies (e.g., McAfee, Symantec, etc.) now sell mobile anti-virus, firewall, and encryption products that aim to slow this degradation. However, many of these solutions rely on the periodic execution of a computationally-intensive scanning engine on the mobile computing device, which may consume many of the mobile computing device's processing and battery resources, slow or render the mobile computing device useless for extended periods of time, and/or otherwise degrade the user experience. In addition, these solutions are typically limited to detecting known viruses and malware, and do not address the multiple complex factors and/or the interactions that often combine to contribute to a mobile computing device's degradation over time (e.g., when the performance degradation is not caused by viruses or malware). For these and other reasons, existing anti-virus, firewall, and encryption products do not provide adequate solutions for identifying the numerous factors that may contribute to a mobile computing device's degradation over time or for preventing mobile computing device degradation.

SUMMARY

The various aspects provide a method for recognizing and preventing malicious behavior on a mobile computing device before it occurs by monitoring instructions pending in the mobile computing device's hardware pipeline or instruction queue (i.e., queued instructions) and taking preventive actions when execution of a queued instruction is likely to result in or lead to malicious behavior. In the various aspects, a mobile computing device may preemptively determine whether executing one or more queued instructions will result in a malicious configuration given the mobile computing device's current configuration. When the mobile computing device determines that executing the queued instructions will result in a malicious configuration, the mobile computing device may stop execution of the queued instructions or take other actions to preempt the malicious behavior before the queued instructions are executed.

In an aspect, a control unit in hardware may access the queued instructions in the hardware pipeline and provide the queued instructions to a behavior analyzer unit configured to determine whether malicious activity will occur if the queued instructions in the hardware pipeline are executed. After receiving access to the queued instructions, the behavior analyzer unit may apply the queued instructions to the mobile computing device's current configuration information to determine whether executing the queued instructions would cause the mobile computing device to enter a malicious configuration.

In another aspect, when the behavior analyzer unit determines that executing the queued instructions would cause the mobile computing device to enter a malicious configuration, the behavior analyzer unit may alert the control unit of impending malicious behavior, and in response, the control unit may prevent the queued instructions from executing, thereby preventing the malicious behavior from occurring, for example, by purging the hardware pipeline of malicious pathway instructions or modifying the queued instructions to ensure that they may be executed without causing malicious behavior.

In an aspect, the mobile computing device may implement the operations described above only when there is some detected risk of malicious behavior occurring in the near future. In an aspect, the mobile computing device may receive a malicious and pathway configuration database that includes a list of malicious configurations and configurations at risk of leading to those malicious configurations (i.e., pathway configurations). Based on the malicious and pathway configuration database, the behavior analyzer unit may periodically compare the mobile computing device's current configuration with the configurations included in the malicious and pathway configuration database. When the behavior analyzer unit determines that the mobile computing device's current configuration is a pathway configuration, the behavior analyzer unit may begin the process of preventing execution of malicious pathway instructions in light of the detected risk of experiencing malicious behavior in the near future.

In an aspect, when the behavior analyzer unit determines that the mobile computing device's current state is a pathway configuration and alerts the control unit, the control unit may block, freeze, or slow the execution of the queued instructions in the hardware pipeline. By altering the schedule of execution of the queued instruction, the control unit may provide the behavior analyzer unit with more time to determine whether executing the queued instructions would put the application into a malicious configuration.

In an alternative aspect, when the behavior analyzer unit determines that the mobile computing device's current state is a pathway configuration and alerts the control unit, the control unit may use best efforts to determine whether executing the queued operations will result in a malicious configuration without changing the execution schedule of the queued instructions in the hardware pipeline. While the queued instructions may execute before the behavior analyzer unit determines that the queued instructions are malicious in some cases, the behavior analyzer unit may still begin its analysis before the queued instructions are executed, enabling the behavior analyzer unit to detect malicious behavior sooner than contemporary methods that begin checking for malicious behavior only after the malicious behavior starts.

The various aspects include a method of preventing malicious behaviors on a mobile computing device that includes a hardware pipeline, including accessing instructions currently queued in the hardware pipeline (i.e., "queued instructions"), determining whether executing the queued instructions could result in a malicious configuration, and preventing execution of the queued instructions in response to determining that executing the queued instructions could result in a malicious configuration. In another aspect, determining whether executing the queued instructions could result in a malicious configuration may include applying the queued instructions to a current configuration of the mobile computing device to generate an expected configuration and determining whether the expected configuration is included in a list of known malicious configurations. In another aspect, preventing execution of the queued instructions in response to determining that executing the queued instructions could result in a malicious configuration may include one of purging the queued instructions from the hardware pipeline and modifying the queued instructions to enable the mobile computing device to execute the queued instructions without causing malicious behavior. In an aspect, the method may also include receiving a list of malicious pathway instructions from a network server, and determining whether executing the queued instructions could result in a malicious configuration may include determining whether the queued instructions are included in the list of malicious pathway instructions.

In an aspect, the method may also include receiving a list of potentially malicious pathway instructions and associated likelihood values, in which each likelihood value indicate a likelihood that executing its associated malicious pathway instruction will result in a malicious configuration. In this aspect, determining whether executing the queued instructions could result in a malicious configuration may include determining whether any queued instructions are included in the list of potentially malicious pathway instructions, determining a likelihood that executing the queued instructions will result in a malicious configuration based on likelihood values associated with any queued instructions determined to be included in the list of potentially malicious pathway instructions, and determining whether the determined likelihood exceeds a risk threshold, which may be a user-settable parameter.

In another aspect, the method may also include receiving a malicious and pathway configuration database from a network server, determining a current configuration of the mobile computing device, and determining whether the current configuration of the mobile computing device could lead to a malicious configuration based on the malicious and pathway configuration database received from the network server. In an aspect, accessing instructions currently queued in the hardware pipeline may include slowing execution of the queued instructions in response to determining that the current configuration of the mobile computing device could lead to a malicious configuration and accessing the queued instructions after slowing execution of the queued instructions; and determining whether executing the queued instructions could result in a malicious configuration may include determining whether executing the queued instructions could result in a malicious configuration in response to determining that the current configuration of the mobile computing device is leading to a malicious configuration.

In another aspect, the method may also include receiving a malicious and pathway configuration database from a network server, determining a current configuration of the mobile computing device, and determining whether the current configuration of the mobile computing device could lead to a malicious configuration based on the malicious and pathway configuration database received from the network server; determining whether executing the queued instructions could result in a malicious configuration may include determining whether executing the queued instructions could result in a malicious configuration in response to determining that the current configuration of the mobile computing device could lead to a malicious configuration; and preventing execution of the queued instructions in response to determining that executing the queued instructions could result in a malicious configuration may include determining whether the queued instructions have already been executed in response to determining that executing the queued instructions could result in a malicious configuration, preventing execution of the queued instructions in response to determining that the queued instructions have not already been executed, and implementing malicious behavior mitigation in response to determining that the queued instructions have already been executed.

Further aspects include a mobile computing device that may include a memory, a hardware pipeline coupled to the memory, a control unit coupled to the hardware pipeline and the memory and configured to perform operations of the methods described above.

Further aspects include a mobile computing device including means for accessing instructions currently queued in a hardware pipeline (i.e., "queued instructions"), means for performing functions of the methods described above.

Further aspects include a non-transitory processor-readable storage medium having stored thereon processor-executable instructions configured to cause a mobile device processor to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
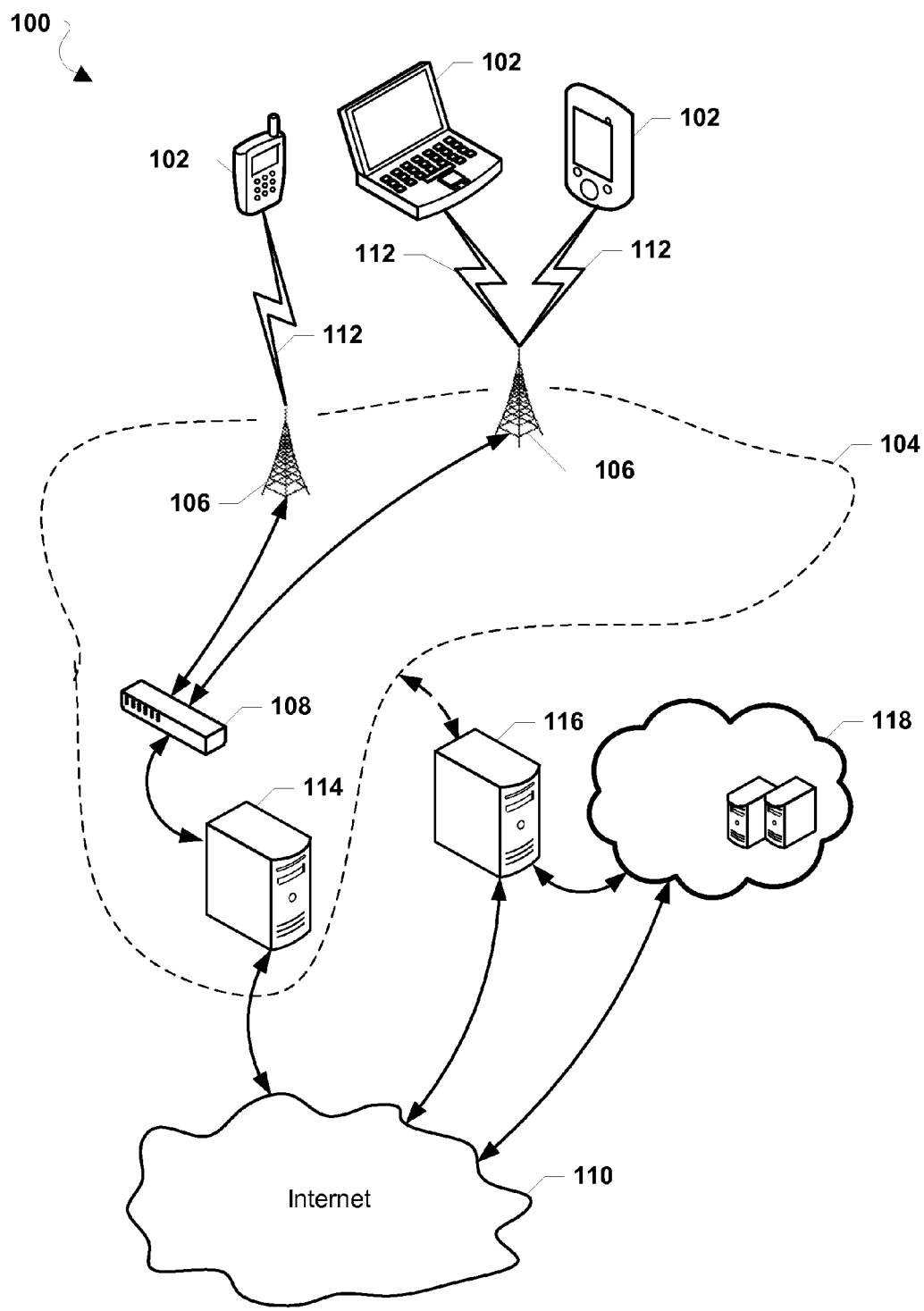
FIG. 1 is a communication system block diagram illustrating network components of an example communication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "mobile computing device" herein refers to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

The term "malicious behavior" is used herein to refer to a wide variety of undesirable mobile computing device operations and characteristics, such as longer processing times, lower battery life, loss of private data, malicious economic activity (e.g., sending unauthorized premium SMS message), operations relating to commandeering the mobile computing device or utilizing the phone for spying or botnet activities, etc.

The term "malicious configuration" is used herein to refer to a configuration of a mobile computing device, application, process, etc. that exhibits or performs malicious behavior. The term "pathway configuration" is used herein to refer to a behavioral vector, state, or configuration that a network server has recognized as leading to a malicious configuration. The term "malicious pathway instruction" is used herein to refer to instructions that when executed while the mobile computing device is in a pathway configuration lead to a malicious configuration.

There are a variety of factors that may contribute to the degradation in performance and power utilization levels of a mobile computing device over time, including poorly designed software applications, malware, viruses, fragmented memory, background processes, and other malicious behavior. However, due to the complexity of modern mobile computing devices, it is increasingly difficult for users, operating systems, and/or application programs (e.g., anti-virus software, etc.) to accurately and efficiently identify the sources of such problems and/or to provide adequate remedies to identified problems.

Various solutions currently exist for detecting malicious behavior on a computing device. Many solutions have traditionally relied on a signature database of malicious code/malware built on a server. These solutions require referencing a signature database to detect whether code is malicious based on the identity (i.e., signature) of the code, such as the name of a file, the name of a function call, the structure of a particular code segment, and even the signature of each byte of code. However, these solutions are inadequate to detect malicious behavior that may be undetectable until the code is executed and are increasingly ineffective as a result of new techniques of forging signatures. In contrast, the various aspects described below enable a mobile computing device to detect malicious behavior during normal operations (i.e., in real time) and prevent such malicious behavior from occurring in the future, regardless of any particular identity or signature.

Other solutions use behavioral models to differentiate between malicious and benign process/programs on computing devices. However, these solutions are currently limited to evaluating the current/on-going behavior of individual application programs or processes. Thus, these solutions are limited to resolving problems only after they have already begun. In contrast, the various aspects described below enable a mobile computing device to anticipate and prevent the execution of malicious pathway instructions in real time before such malicious behavior occurs.

Additionally, some solutions look for signs of malicious behavior in code, files, scripts, etc. before they are executed by initiating preemptive scans. For instance, a solution may require a file downloaded from a location on the Internet to be scanned for viruses before the file can be executed locally. Other solutions attempt to discover malicious behavior by executing programs or processes in a safe environment (e.g., a virtual machine) and attempting to discover whether the programs or processes behave maliciously when run. However, these solutions require an investment of considerable computation resources because each suspected programs, files, processes, etc. must be determined to be benign before being allowed to execute as part of normal operations.

In contrast to conventional approaches, the various aspects described below enable a mobile computing device to detect and prevent malicious behavior in real time, thereby avoiding the considerable startup costs of contemporary methods and allowing applications and processes to execute normally until the mobile computing device detects a credible risk of future malicious behavior. In overview, the various aspects provide a method for recognizing and preventing malicious behavior on a mobile computing device before it occurs by monitoring instructions pending in the mobile computing device's hardware pipeline or instruction queue (i.e., queued instructions) and taking preventive actions when execution of a queued instruction is likely to result in or lead to malicious behavior. In the various aspects, a mobile computing device may preemptively determine whether executing one or more queued instructions will result in a malicious configuration given the mobile computing device's current configuration. When the mobile computing device determines that executing the queued instructions will result in a malicious configuration, the mobile computing device may stop execution of the queued instructions or take other actions to preempt the malicious behavior before the queued instructions are executed.

In various aspects, the mobile computing device may include components configured to prevent the execution of malicious pathway instructions. The mobile computing device may include a hardware pipeline that includes instructions ready for execution by a processor. The mobile computing device may also include a behavior analyzer unit configured to determine whether malicious activity will occur if the queued instructions in the hardware pipeline are executed. In another aspect, the mobile computing device may include a control unit implemented in hardware and configured to control the operations of the hardware pipeline.

In an aspect, the control unit may access the queued instructions in the hardware pipeline and provide the queued instructions to the behavior analyzer unit. For example, the control unit may peak into the hardware pipeline and may pass the queued instructions and their addresses in memory to the behavior analyzer unit. After receiving access to the queued instructions, the behavior analyzer unit may apply the queued instructions to the mobile computing device's current configuration information to determine whether executing the queued instructions would cause the mobile computing device to enter a malicious configuration.

In another aspect, when the behavior analyzer unit determines that executing the queued instructions would cause the mobile computing device to enter a malicious configuration, the behavior analyzer unit may alert the control unit of impending malicious behavior, and in response, the control unit may prevent the queued instructions from executing, thereby preventing the malicious behavior from occurring. In a further aspect, the control unit may prevent the queued instructions from executing by purging the hardware pipeline of malicious pathway instructions. In another aspect, the mobile computing device may modify the queued instructions to ensure that they may be executed without causing malicious behavior.

In further aspects, the mobile computing device may implement the operations described above only when there is some detected risk of malicious behavior occurring in the near future. In an aspect, the mobile computing device may receive a malicious and pathway configuration database that includes a list of malicious configurations and configurations at risk of leading to those malicious configurations (i.e., pathway configurations). Based on the malicious and pathway configuration database, the behavior analyzer unit may periodically compare the mobile computing device's current configuration with the configurations included in the malicious and pathway configuration database. When the behavior analyzer unit determines that the mobile computing device's current configuration is a pathway configuration, the behavior analyzer unit may begin the process of preventing execution of malicious pathway instructions in light of the detected risk of experiencing malicious behavior in the near future.

In an aspect, after the behavior analyzer unit determines that the mobile computing device's current state is a pathway configuration and alerts the control unit, the control unit may block, freeze, or slow the execution of the queued instructions in the hardware pipeline. By altering the schedule of execution of the queued instruction, the control unit may provide the behavior analyzer unit with more time to determine whether executing the queued instructions would put the application into a malicious configuration. In other words, the look-ahead analysis of queued instructions may not need to reach a definitive determination, and slowing the execution of queued instructions may give the behavior analyzer unit more time to analyze the instructions before they are executed. In a further aspect, a mobile computing device that includes multiple processing units or one or more multicore processors may selectively block, slow, freeze a processor or processor core scheduled to execute malicious pathway instructions and may allow other processors/cores to execute harmless operations without interruption.

In an alternative aspect, after the behavior analyzer unit determines that the mobile computing device's current state is a pathway configuration and alerts the control unit, the control unit may not block, freeze, or slow the execution of the queued instructions in the hardware pipeline. Instead, the behavior analyzer unit may use best efforts to determine whether the queued operations will results in a malicious configuration without changing the execution schedule of the queued instructions in the hardware pipeline. As a result, malicious pathway instructions may be executed if the behavior analyzer unit is unable to determine that they are malicious in time, but by not slowing the instructions' execution, the control unit may not slow the mobile computing device's overall performance. Further, while the queued instructions may execute before the behavior analyzer unit determines that the queued instructions are malicious, the behavior analyzer unit may still enjoy a "head start" over conventional methods of detecting malicious behavior. In other words, because the behavior analyzer unit begins its analysis before the queued instructions are executed, the behavior analyzer unit may detect malicious behavior sooner than contemporary methods that begin checking for malicious behavior only after the malicious behavior starts.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile computing devices 102 (e.g., cell phones, laptops, tablets, etc.) and other network destinations, such as via telephone land lines (e.g., a POTS network, not shown) and the Internet 110. Communications between the mobile computing devices 102 and the telephone network 104 may be accomplished via two-way wireless communication links 112, such as 4 G, 3 G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 118 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communication between the network server 116 and the mobile computing devices 102 may be achieved through the telephone network 104, the internet 110, private network (not illustrated), or any combination thereof.

The mobile computing devices 102 may collect behavioral, state, classification, modeling, success rate, and/or statistical information in the mobile computing device 102, and send the collected information to the network server 116 (e.g., via the telephone network 104) for analysis. In an aspect, the mobile computing devices 102 may send their current configuration information (e.g., their behavioral vectors describing their current state) after experiencing malicious behavior. The mobile computing device 102 may also send their configuration histories to the network server 116. The configuration histories may include a history of configuration changes that occurred leading up to the discovery of malicious behavior, as well as the instructions that caused those configuration changes. The network server 116 may use information received from the mobile computing devices 102 to determine a list of malicious configurations and configurations leading up to the malicious configurations (i.e., pathway configurations).

In another aspect, the network server 116 may send malicious and pathway configuration databases to the mobile computing devices 102, which may receive and use the malicious and pathway configuration databases to predict future malicious behavior before it occurs. The network server 116 may send subsequent malicious and pathway configuration databases to the mobile computing devices 102 to replace, update, create and/or maintain mobile computing device data/behavior models.

Figure 2:
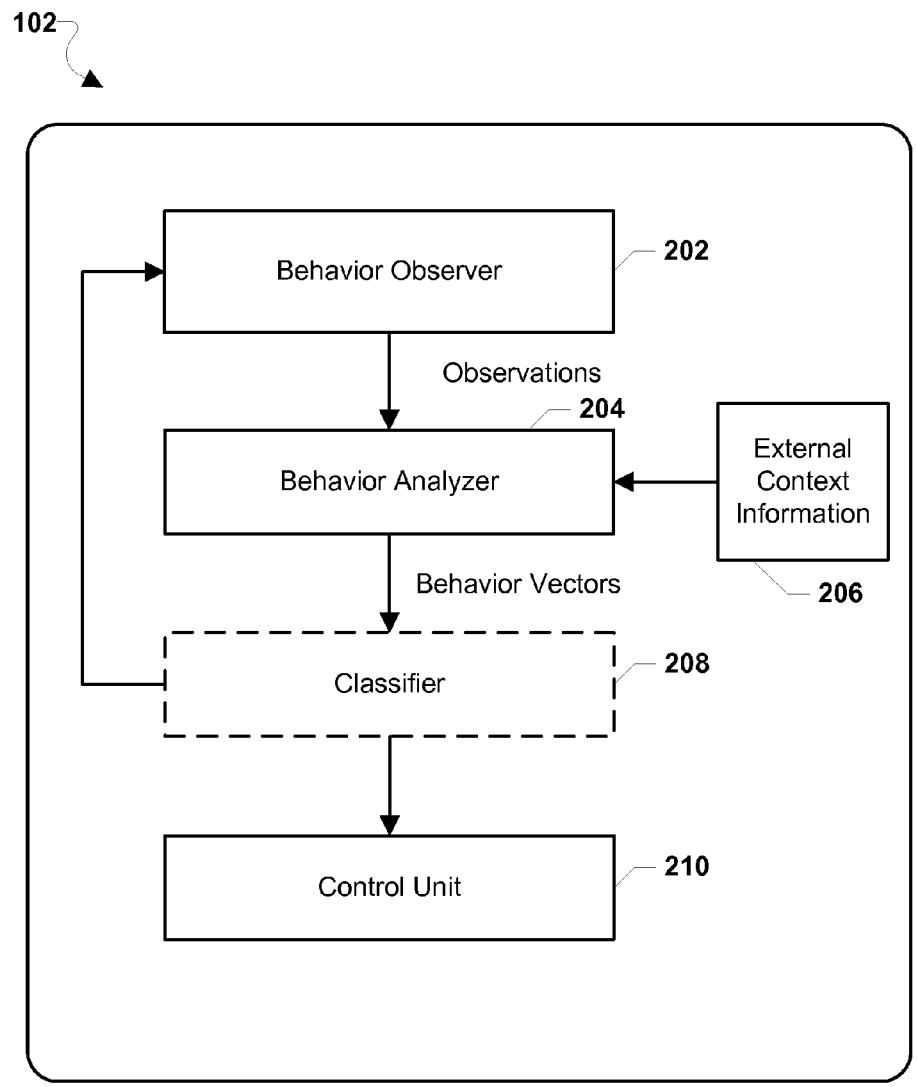
FIG. 2 is a block diagram illustrating example logical components and information flows in an aspect mobile computing device configured to determine whether a particular mobile computing device behavior, software application, or process could lead to malicious behavior.

FIG. 2 illustrates example logical components and information flows in an aspect mobile computing device 102 configured to determine whether a particular mobile computing device behavior, software application, or process is malicious, suspicious, or benign. In the example illustrated in FIG. 2, the mobile computing device 102 may include a behavior observer unit 202, a behavior analyzer unit 204, an external context information unit 206, an optional classifier unit 208, and a control unit 210. In an aspect, the classifier unit 208 may be implemented as part of the behavior analyzer unit 204. In an aspect, the behavior analyzer unit 204 may be configured to generate one or more classifier units 208, each of which may include one or more classifiers.

Each of the units 202-208 may be implemented in software, hardware, or any combination thereof. In various aspects, the units 202-208 may be implemented within parts of the operating system (e.g., within the kernel, in the kernel space, in the user space, etc.), within separate programs or applications, in specialized hardware buffers or processors, or any combination thereof. In an aspect, one or more of the units 202-208 may be implemented as software instructions executing on one or more processors of the mobile computing device 102. In another aspect, control unit 210 may be implemented as low-level hardware component within the mobile computing device 102 to enable the control unit 210 to quickly access instructions stored in a hardware pipeline and to control the hardware pipeline's operations.

The behavior observer unit 202 may be configured to instrument or coordinate application programming interfaces (APIs) at various levels/modules of the mobile computing device, and monitor/observe mobile computing device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer unit 204.

The behavior observer unit 202 may monitor/observe mobile computing device operations and events by collecting information pertaining to library API calls in an application framework or run-time libraries, system call APIs, file-system and networking sub-system operations, device (including sensor devices) state changes, and other similar events. The behavior observer unit 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer unit 202 may also monitor data network activity, which may include types of connections, protocols, port numbers, server/client that the device is connected to, the number of connections, volume or frequency of communications, etc. The behavior observer unit 202 may monitor phone network activity, which may include monitoring the type and number of calls or messages (e.g., SMS, etc.) sent out, received, or intercepted (e.g., the number of premium calls placed).

The behavior observer unit 202 may also monitor the system resource usage, which may include monitoring the number of forks, memory access operations, number of files open, etc. The behavior observer unit 202 may monitor the state of the mobile computing device, which may include monitoring various factors, such as whether the display is on or off, whether the device is locked or unlocked, the amount of battery remaining, the state of the camera, etc. The behavior observer unit 202 may also monitor inter-process communications (IPC) by, for example, monitoring intents to crucial services (browser, contracts provider, etc.), the degree of inter-process communications, pop-up windows, etc.

The behavior observer unit 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer unit 202 may also monitor/observe one or more hardware counters that denote the state or status of the mobile computing device and/or mobile computing device sub-systems. A hardware counter may include a special-purpose register of the processors/cores that is configured to store a count or state of hardware-related activities or events occurring in the mobile computing device.

The behavior observer unit 202 may also monitor/observe actions or operations of software applications, software downloads from an application download server (e.g., Apple® App Store server), mobile computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer unit 202 may monitor/observe transmissions or communications of the mobile computing device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer unit 202 may monitor/observe usage of and updates/changes to compass information, mobile computing device settings, battery life, gyroscope information, pressure sensors, magnet sensors, screen activity, etc. The behavior observer unit 202 may monitor/observe notifications communicated to and from a software application (AppNotifications), application updates, etc. The behavior observer unit 202 may monitor/observe conditions or events pertaining to a first software application requesting the downloading and/or install of a second software application. The behavior observer unit 202 may monitor/observe conditions or events pertaining to user verification, such as the entry of a password, etc.

The behavior observer unit 202 may also monitor/observe conditions or events at multiple levels of the mobile computing device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile computing device before establishing radio communication links or transmitting information, dual/multiple SIM cards, Internet radio, mobile phone tethering, offloading data for computations, device state communications, the use as a game controller or home controller, vehicle communications, mobile computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device. For example, the mobile computing device processor may be configured to determine whether the phone is in a holster (e.g., via a magnet sensor configured to sense a magnet within the holster) or in the user's pocket (e.g., via the amount of light detected by a camera or light sensor). Detecting that the mobile computing device is in a holster may be relevant to recognizing malicious behaviors, for example, because activities and functions related to active usage by a user (e.g., taking photographs or videos, sending messages, conducting a voice call, recording sounds, etc.) occurring while the mobile computing device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a USB power charging source, detecting that a keyboard or auxiliary device has been coupled to the mobile computing device, detecting that the mobile computing device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device, etc.

To reduce the number of factors monitored to a manageable level, in an aspect, the behavior observer unit 202 may perform coarse observations by monitoring/observing an initial set of behaviors or factors that are a small subset of all factors that could contribute to the mobile computing device's degradation. In an aspect, the behavior observer unit 202 may receive the initial set of behaviors and/or factors from a network server 116 and/or a component in a cloud service or network 118. In an aspect, the initial set of behaviors/factors may be specified in data/behavior models received from the network server 116 or cloud service/network 118. In an aspect, the initial set of behaviors/factors may be specified in a reduced feature model (RFMs).

The behavior analyzer unit 204 and/or classifier unit 208 may receive the observations from the behavior observer unit 202, compare the received information (i.e., observations) with contextual information received from the external context information unit 206, and identify subsystems, processes, and/or applications associated with the received observations that are contributing to (or are likely to contribute to) the device's degradation over time, or which may otherwise cause problems on the device (e.g., malicious behavior).

In an aspect, the behavior analyzer unit 204 and/or classifier unit 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer unit 204 may be configured to analyze information (e.g., in the form of observations) collected from various units (e.g., the behavior observer unit 202, external context information unit 206, etc.), learn the normal operational behaviors of the mobile computing device, and generate one or more behavior vectors based the results of the comparisons. The behavior analyzer unit 204 may send the generated behavior vectors to the classifier unit 208 for further analysis.

The classifier unit 208 may receive the behavior vectors and compare them to one or more behavior modules to determine whether a particular mobile computing device behavior, software application, or process is malicious.

When the classifier unit 208 determines that a behavior, software application, or process is malicious, the classifier unit 208 may notify an actuator unit (not shown), which may perform various actions or operations to correct mobile computing device behaviors determined to be malicious and/or perform operations to heal, cure, isolate, or otherwise fix the identified problem.

In further aspects, the behavior analyzer unit 204 and/or the classifier unit 208 may reference a malicious and pathway configuration database received from a network server (e.g., network server 116) to determine whether the current configuration of the mobile computing device 102 is a pathway configuration. In an aspect, the classifier unit 208 (or the behavior analyzer unit 204) may compare a behavior vector of the mobile computing device's current configuration with one or more pathway configurations included in the malicious and pathway configuration database received from the network server to determine whether the current behavior vector of the mobile computing device 102 matches a pathway configuration included in the malicious and pathway configuration database. For example, the behavior analyzer unit 204 may generate a behavioral vector for a particular application currently running on the mobile computing device, and the classifier unit 208 may compare the application's behavioral vector with pathway configurations included in the malicious and pathway configuration database to determine whether the application's current configuration could lead to malicious behavior on the mobile computing device.

When the behavior analyzer unit 204 determines that the mobile computing device 102's current configuration is included in the malicious and pathway configuration database received from the network server (i.e., that the mobile computing device 102's current configuration could lead to malicious behavior), the behavior analyzer unit 204 may notify the control unit 210, which may begin to perform various actions or operations to prevent malicious pathway instructions from being executed on the mobile computing device as further described below with reference to FIG. 4.

Figure 3:
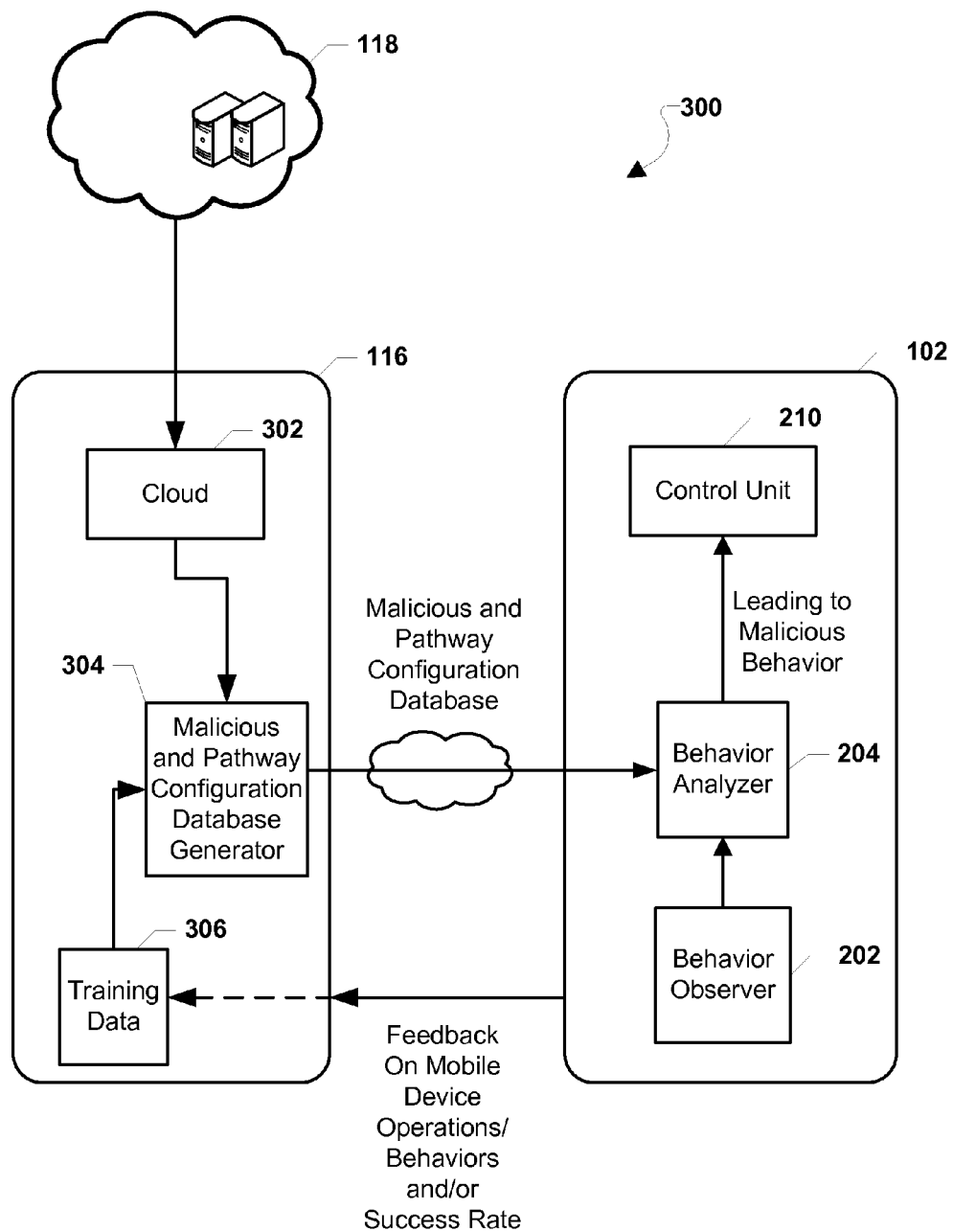
FIG. 3 is a block diagram illustrating example components and information flows in an aspect system with a network server configured in a cloud service/network to identify malicious configurations and configurations leading to malicious behavior and to send these configurations to a mobile computing device for use in avoiding malicious behaviors on a mobile computing device.

FIG. 3 illustrates example components and information flows in an aspect system 300 that includes a network server 116 configured to work in conjunction with a cloud service/network 118 to intelligently and efficiently identify configurations leading up to malicious behaviors on the mobile computing device 102. In the example illustrated in FIG. 3, the network server 116 includes a cloud unit 302, a malicious and pathway configuration database generator unit 304, and a training data unit 306. The mobile computing device 102 includes a behavior observer unit 202, a behavior analyzer unit 204, and a control unit 210. In an aspect, the behavior analyzer unit 204 may include the classifier unit 208 (illustrated in FIG. 2). In an aspect, the malicious and pathway configuration database generator unit 304 may be a real-time online classifier.

The cloud unit 302 may be configured to receive a large amount of information from a cloud service/network 118 and generate a full or robust data/behavior model that includes all or most of the features, data points, and/or factors that lead to malicious behaviors. In an aspect, the information from the cloud service/network 118 may include configuration information and configuration histories reported from multiple mobile computing devices that detected some form of malicious behavior. For example, multiple mobile computing devices may have reported malicious behavior for a particular configuration and may have also reported their configurations/states/instructions leading up to the malicious behavior detected.

The malicious and pathway configuration database generator unit 304 may generate a malicious and pathway configuration database that includes behavior models based on a full behavior model generated in the cloud unit 302. In an aspect, generating the behavior models may include generating one or more reduced feature models (RFMs) that include a subset of the features and data points included in the full model generated by the cloud unit 302. In an aspect, the pathway configuration database generator unit 304 may generate a behavior model that includes an initial feature set (e.g., an initial reduced feature model) that includes information determined to have a highest probability of enabling the behavior analyzer unit 204 to conclusively determine whether a particular mobile computing device behavior could lead to malicious behavior. The pathway configuration database generator unit 304 may send the generated malicious and pathway configuration database to the behavior analyzer unit 204.

The behavior observer unit 202 may monitor/observe mobile computing device behaviors on the mobile computing device 102, generate observations, and send the observations to the behavior analyzer unit 204. The behavior analyzer unit 204 may perform real-time analysis operations, which may include comparing behavior models in the malicious and pathway configuration database to configuration information collected by the behavior observer unit 202 to determine whether the mobile computing device 102's current state could lead to malicious behavior. The behavior analyzer unit 204 may determine that a mobile computing device behavior could lead to malicious behavior when the behavior analyzer unit 204 determines that the mobile computing device 102's current configuration matches a pathway configuration included in the malicious and pathway configuration database. As discussed above with reference to FIG. 2, when the behavior analyzer unit 204 finds a match, the behavior analyzer unit 204 may alert the control unit 210 to begin taking steps to prevent execution of malicious pathway instructions in the hardware pipeline.

In another aspect, the mobile computing device 102 may send the results of its operations and/or success rates associated with the application of models to the network server 116. For example, the behavior analyzer unit 204 may not find a match in the malicious and pathway configuration database, but malicious behavior may still occur, thereby indicating previously undetected malicious behavior (i.e., a gap in protection) that the mobile computing device 102 may report to the network server 116 to include in a next distribution of malicious and pathway configuration databases. The network server 116 may generate training data (e.g., via the training data unit 306) based on the results/success rates for use by the pathway configuration database generator unit 304. The model generator may generate updated malicious and pathway configuration databases based on the training data, and send the updated malicious and pathway configuration databases to the mobile computing device 102 and other mobile computing devices on a periodic basis.

Figure 4:
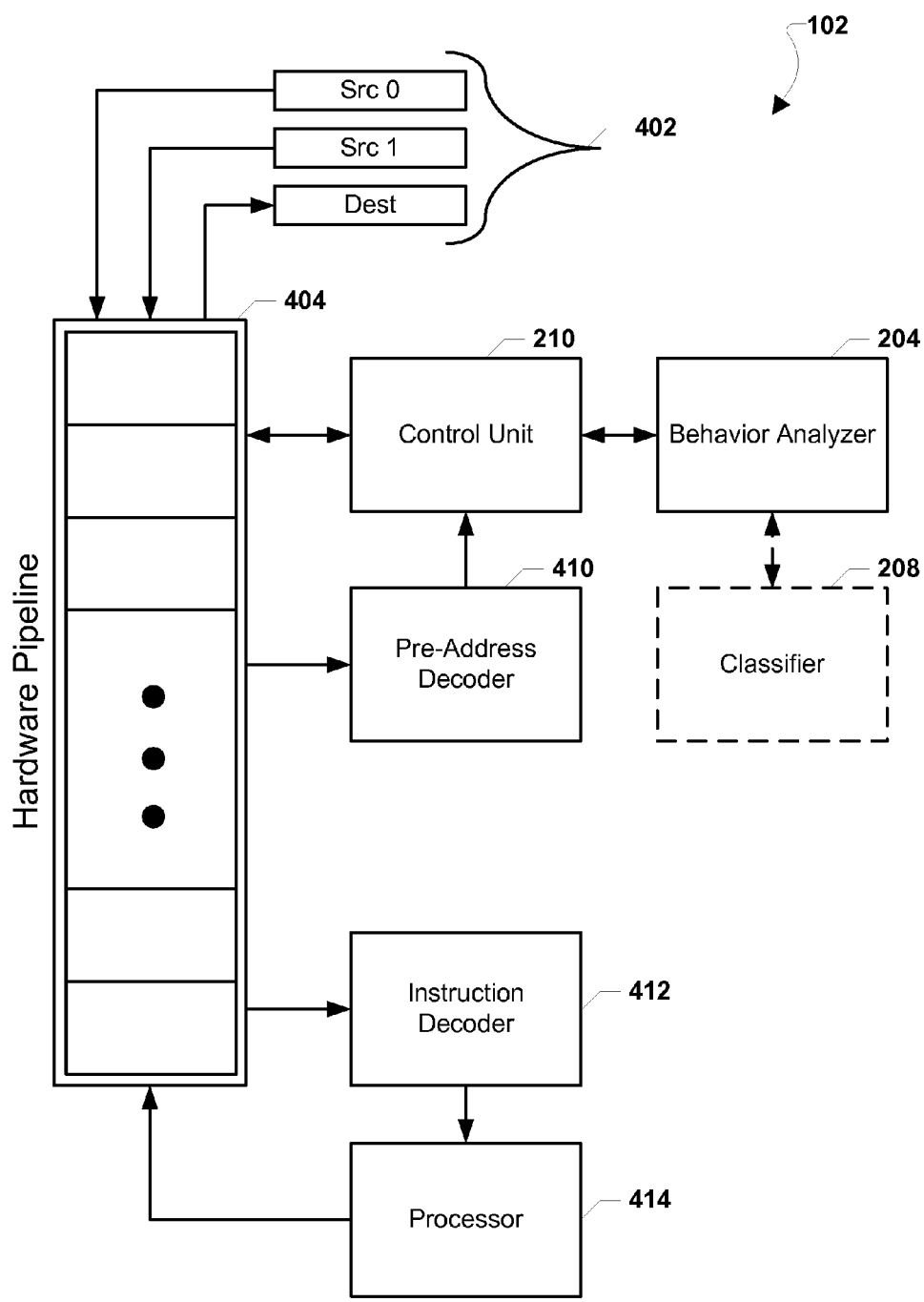
FIG. 4 is a system diagram of components included in an aspect mobile computing device and suitable for use in preventing the execution of malicious pathway instructions in a hardware pipeline according to an aspect.

FIG. 4 illustrates a system block diagram of components included in a mobile computing device 102 that may be suitable for use in preventing execution of malicious pathway instructions.

In an aspect, the mobile computing device 102 may include a hardware pipeline 404. The hardware pipeline 404 may be a hardware component that manages low-level instructions (e.g., machine code) scheduled to be executed by a processor 414. Because the hardware pipeline 404 must receive, manage, and provide such low-level instructions, the hardware pipeline itself may function at a very deep level in the mobile computing device's hardware system.

While applications, processes, or other components operating on the mobile computing device 102 are being processed, the hardware pipeline 404 may receive instructions ready for execution. These instructions may be stored in various registers 402 in a memory, and the hardware pipeline 404 may send and receive instructions ready for execution from such registers 402 (e.g., receiving instructions stored in source registers "Src 0" and "Src 1" and passing instructions to a destination register "Dest"). The hardware pipeline 404 may function as a queue of instructions ready to be executed, and the hardware pipeline 404 may pass the next instructions scheduled to be executed to the processor 414 or an instruction decoder 412. The instruction decoder 412 may convert the bits stored in the hardware pipeline 404 into the control signals that are passed to the processor 414.

Because of the low-level position of the hardware pipeline 404 in the mobile computing device and because the hardware pipeline 404 is one of the last components in the mobile computing device 102 to handle instructions before they are executed on the processor 414, the total amount of time an instruction remains in the hardware pipeline may be very short. For example, one-hundred milliseconds may elapse from the time the hardware pipeline 404 receives an instruction ready for execution to the time the hardware pipeline 404 send that instruction to the instruction decoder 412. Thus, by the time the hardware pipeline 404 receives an instruction, it may be too late for applications or processes operating on the mobile computing device 102 (including malware, viruses, or other malicious processes) to change those instructions ready for execution. In other words, the instructions currently stored in the hardware pipeline 404 may be a preview or snapshot of the instructions that the processor 414 will execute in the near future.

The various aspects leverage the fact that the hardware pipeline includes a preview of the instructions that will be executed in the near future to prevent the execution of instructions that will cause malicious behavior. Specifically, the mobile computing device 102 may include a control unit 210 designed to interface with the hardware pipeline 404. In overview, the control unit 210 may access instructions in the hardware pipeline 404 (i.e., peak into the hardware pipeline 404) and pass these instructions to a behavior analyzer unit 204. The behavior analyzer unit 204 may analyze the instructions included in the hardware pipeline 404 and determine whether executing the instructions will cause malicious behavior, and the control unit 210 may take appropriate measures to prevent execution of instructions in the hardware pipeline 404 that the behavior analyzer unit 204 determined to be malicious (i.e., determined to cause malicious behavior if executed).

In an aspect, the control unit 210 may obtain pre-addresses of the instructions in the hardware pipeline 404 from a pre-address decoder 410 in order to determine the location of the instructions in the hardware pipeline 404 to check. The control unit 210 may also check for branch instructions and decide the range of queued instructions that need to be fetched and sent to the behavior analyzer unit 204 for analysis. For example, the control unit 210 may receive input from the pre-address decoder 410 that enables the control unit 210 to determine that the instructions to be checked in the hardware pipeline 404 branch from line 3 to line 27. In another aspect, the pre-address decoder 410 may also send information to the control unit 210 to enable the control unit 210 to determine whether the instructions are going to write to a valid memory location.

After receiving the instructions and the instructions' addresses from the control unit 210, the behavior analyzer unit 204 may determine whether executing instructions will result in a malicious configuration. In an aspect, the behavior analyzer unit 204 may apply the instructions to the mobile computing device 102's current configuration to produce a preview of the configuration of the mobile computing device 102 expected after the instructions are executed (i.e., an "expected configuration"). For example, the behavior analyzer unit 204 may generate an expected configuration by simulating the effects of executing the instructions on the mobile computing device 102's current behavior vector.

In an aspect, the behavior analyzer unit 204 may classify the expected configuration by comparing the expected configuration with a list of known malicious configurations received from a network server. The network server may have previously compiled a list of known malicious configurations based on information received from multiple mobile computing devices, and the network server may have previously sent this list of malicious configurations to the mobile computing device 102 for use in detecting malicious behavior. Alternatively or in addition, the network server may have provided the mobile computing device 102 with a list of instructions other mobile devices have reported to cause malicious behavior. In another aspect, the behavior analyzer unit 204 may send the expected configuration to a classifier unit 208, which may classify the expected configuration as described above with reference to FIG. 2.

When the behavior analyzer unit 204 determines that the expected configuration is not a malicious configuration, no further action may be taken, and the mobile computing device may continue performing normally. When the behavior analyzer unit 204 determines that the expected configuration is malicious, the behavior analyzer unit 204 may alert the control unit 210, and the control unit 210 may begin implementing various actions to prevent the malicious behavior from occurring, such as purging instructions from the hardware pipeline 404 and inserting "no-ops" into the hardware pipeline 404 in place of identified instructions, or modifying the instructions such that executing those instructions will not cause malicious behavior.

Thus, by predetermining the expected configuration of the mobile computing device 102 by inspecting the instructions included in the hardware pipeline, the behavior analyzer unit 204 and the control unit 210 may work together to anticipate and avoid malicious behavior during the mobile computing device's normal operations before the malicious activity occurs.

Figure 5:
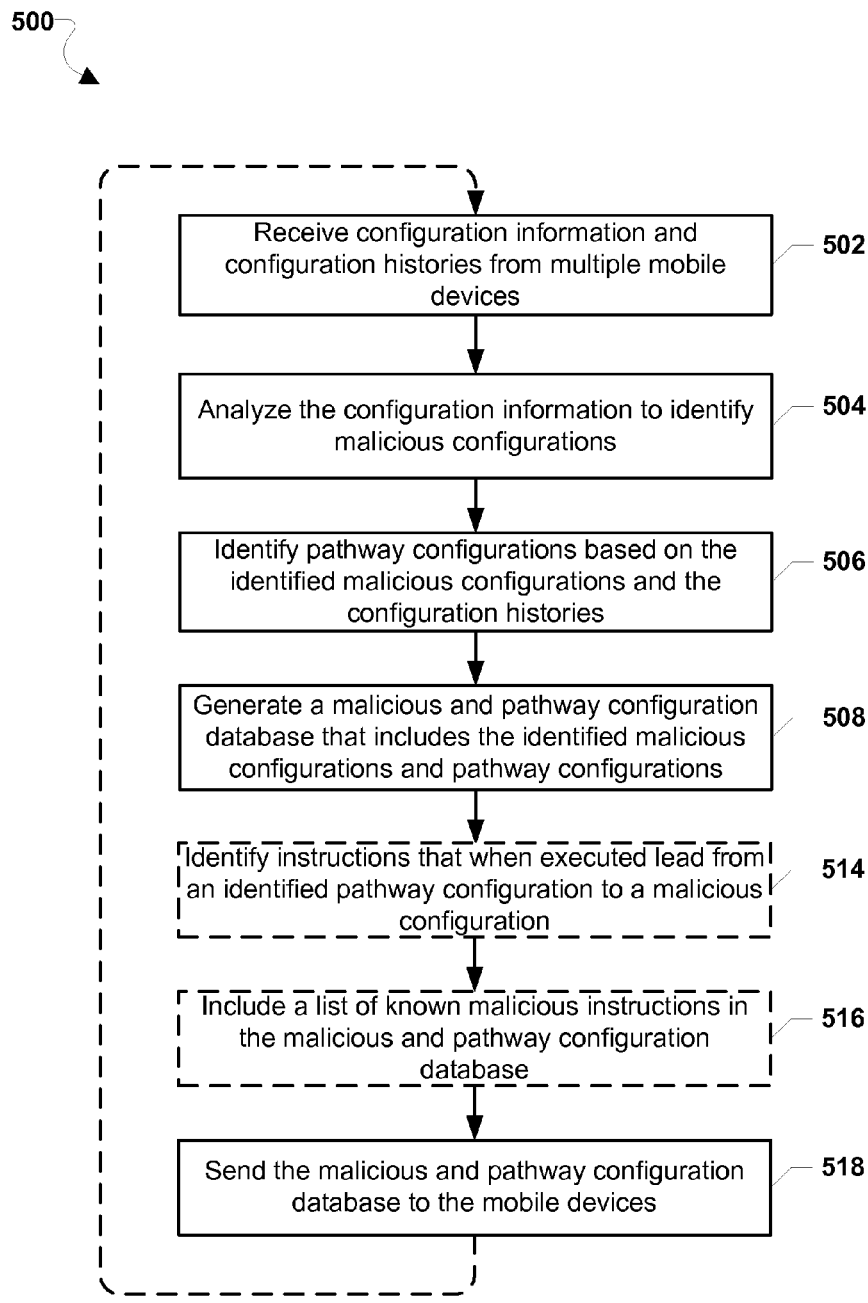
FIG. 5 is a process flow diagram illustrating an aspect method for sending a malicious and pathway configuration database that includes information regarding malicious configurations and pathway configurations to mobile computing devices.

FIG. 5 illustrates an aspect method 500 that may be implemented on a network server for sending mobile computing devices a malicious and pathway configuration database that identifies malicious configurations and pathway configurations. In performing method 500, the network server may function as a centralized hub that receives, compiles, and analyzes information from multiple mobile computing devices to identify configurations indicative of malicious behavior and the pathway configurations leading to those malicious configurations. The server may also provide reports to the multiple mobile computing devices that enable the mobile computing devices to detect whether their current behavior (or the behavior of an application or process operating on the mobile computing devices) is trending towards malicious behavior.

In block 502, the network server may receive configuration information and configuration histories from a plurality of mobile computing devices. In an aspect, when a mobile computing device detects malicious behavior (e.g., being hacked, malware, or viruses, etc.), the mobile computing device may send the network server a behavior vector or similar information that represents the mobile computing device's configuration at the time the mobile computing device discovered the malicious behavior. Additionally, the mobile computing devices may also send configuration histories that describe the progression of configurations that occurred up until the malicious behavior was detected.

In an aspect, the mobile computing device may maintain a list of configuration changes that begins from an initial configuration, such as a startup configuration. For example, a mobile computing device may detect malware activity when its behavior vector is [0, 2, 1, 0, . . . , 4]. The mobile computing device may send the behavior vector [0, 2, 1, 0, . . . , 4] to the network server and information for retracing the mobile computing device's configurations from [0, 2, 1, 0, . . . , 4] to an earlier configuration, such as an initial configuration (e.g., [0, 0, 0, 0, . . . , 0]). In another aspect, the mobile computing device may conserve resources by maintaining only an abbreviated configuration history (i.e., the mobile computing device may only keep an account of a certain number of previous configurations leading up to the malicious configuration). In another aspect, the mobile computing device may record the instructions that were executed leading up to the malicious behavior.

In block 504, the network server may analyze the configuration information to identify malicious configurations. In an aspect, the network server may identify malicious configurations by matching identical or similar behaviors reported to represent malicious behavior. In a further aspect, the network server may identify a configuration as malicious only when a certain number or percentage of mobile computing devices identifies the configuration as malicious. In other words, the network server may employ a confidence threshold to label certain behaviors as malicious only when there is some consensus among the mobile computing devices reporting in.

In another aspect, the network server may receive configuration information from various types and models of mobile computing devices that may not share the same capabilities or configurations, and thus the mobile computing device may have dissimilar configuration information/behavioral vectors. In such an aspect, the network server may identify malicious configurations by implementing various pattern matching algorithms or strategies to detect malicious configurations or particular features that multiple mobile computing devices commonly report to represent malicious behavior. In other words, the network server may compile thousands of reports from mobile computing devices of different models and determine the configuration characteristics consistently present at the time the mobile computing devices detected malicious behavior. For example, the network server may determine that various types of mobile computing devices almost always reported malicious behavior when their configurations included "screen off," "accessing contact information," and "transmitting data."

In block 506, the network server may identify pathway configurations based on the identified malicious configurations and the configuration histories. In an aspect, a pathway configuration may be a "precursor" configuration leading up to a malicious configuration. In other words, a pathway configuration may have a potential or significant probability of evolving into a malicious configuration under some circumstances. In further aspects, a pathway configuration may indicate a risk of malicious behavior in the future before such malicious behavior occurs. For example, a pathway configuration may be one or two configuration changes away from being a malicious configuration.

In an aspect, after receiving numerous configuration histories, the network server may implement pattern recognition or state machine analysis (if the configuration history is presented as transitions between states) to discover one or more patterns or configurations leading to an ultimate malicious configuration. In other words, the network server may use the configuration histories from the various mobile computing devices to "walk back" (i.e., along "configuration paths") from the malicious configuration to identify an earlier configuration or configurations that have led to the malicious configurations. These earlier configurations may be identified as pathway configurations, as defined above, when the analysis determines that there is a significant probability that a subsequent configuration will be malicious. Any given configuration or state may evolve or be transformed into any number of subsequent configurations or states depending upon the instructions or operations that are performed next. Thus, a configuration that preceded a malicious configuration may not necessarily lead to the malicious configuration if other instructions or operations are performed. To address this, the server analysis may determine from the reported information how frequently a given configuration leads directly to a malicious configuration, and identify as "pathway configurations" only those configurations that frequently (i.e., the frequency exceeds a threshold value or probability) lead to malicious configurations. For example, the network server may only classify a configuration as a pathway configuration when there is over a 10% chance that the configuration will lead to malicious behavior. The server analysis may also identify the instructions/operations that when performed transform a pathway configuration into a malicious configuration.

In an aspect, the network server may first identify a malicious configuration/state, one or more intermediate configurations, and a starting configuration. For example, the network sever may first identify that "transmitting address book information while the screen is off" is a malicious configuration and may "walk back" to discover that "accessing address book information while the display screen is off" is a pathway configuration that frequently leads to "transmitting address book information while the screen is off".

In an aspect, to increase the effectiveness of using pathway configurations as early warning signs of future malicious behavior, the network server may only classify a configuration that does not exceed a threshold number of "steps" away from a malicious configuration as a "pathway configuration." The server analysis may also identify the subsequent pathway configurations leading directly to malicious behavior, as well as instructions/operations that when performed take the mobile computing device through the series of steps from the identified pathway configuration to a malicious configuration.

In block 508, the network server may generate a malicious and pathway configuration database that includes the identified malicious configurations and pathway configurations. In an aspect, the malicious and pathway configuration database may include information that may enable a mobile computing device to assess whether the mobile computing device is at risk of entering a malicious configuration as discussed below with reference to FIG. 6.

As discussed above, in optional block 514, the network server may identify instructions or operations that when executed lead from an identified pathway configuration to a malicious configuration. In this operation, the network server may analyze the behavior vector information and configuration histories to identify the code, parameters, or other instructions that cause a pathway configuration to turn into a malicious configuration. The network server may identify such instructions in the context of particular pathway configurations. Thus, the network server may determine the instructions that, when executed, cause pathway configurations to become malicious, thereby enabling a mobile computing device to better determine whether it is at risk of evolving to a malicious configuration. In other words, the network server may determine that a mobile computing device in a particular pathway configuration will become malicious after executing certain instructions that are referred to herein as "malicious pathway instructions." It should be noted that malicious pathway instructions may only result in malicious behavior or malicious configurations when they are executed while the mobile computing device is in a pathway configuration. In this manner the various aspects differ from conventional malware detection systems because the aspects enable recognizing and reacting to instructions/operations that in most circumstances are safe and not associated with malicious behaviors.

In block 516, the network server may include a list of known malicious pathway instructions in the malicious and pathway configuration database. In a further aspect, the network server may also include an association between a pathway configuration and the malicious pathway instruction or instructions that will cause the pathway configuration to become malicious. A mobile computing device may utilize a malicious and pathway configuration database that includes a list of malicious pathway instructions that may transform a pathway configuration to a malicious configuration to avoid such malicious behavior as further described below with reference to FIG. 8A.

In block 518, the network server may send the malicious and pathway configuration database to the mobile computing devices. In various aspects, the mobile computing device may use the malicious and pathway configuration databases for use in preemptively identifying pathway configurations that may lead to malicious behavior. In an aspect, the malicious and pathway configuration databases may present the malicious and pathway configurations as states in a finite state machine, paths, or as behavior vector values that can be utilized by a behavior analyzer unit 204 and/or classifier unit 208 operating on the mobile computing device.

In an optional aspect, the network server may execute the process in a loop as it continually receives behavior vector information and configuration histories from mobile computing devices in block 502. In such an aspect, the network server may receive the behavior vector information and configurations histories on a rolling basis. In other words, the network server may continually receive information of malicious behavior from the mobile computing devices as they occur, and the network server may continually analyze and identify malicious configurations and pathway configurations. As such, the network server may repeat the process in order to continually send out updated malicious and pathway configuration databases to the mobile computing devices based on new information received from the mobile computing devices.

Figure 6:
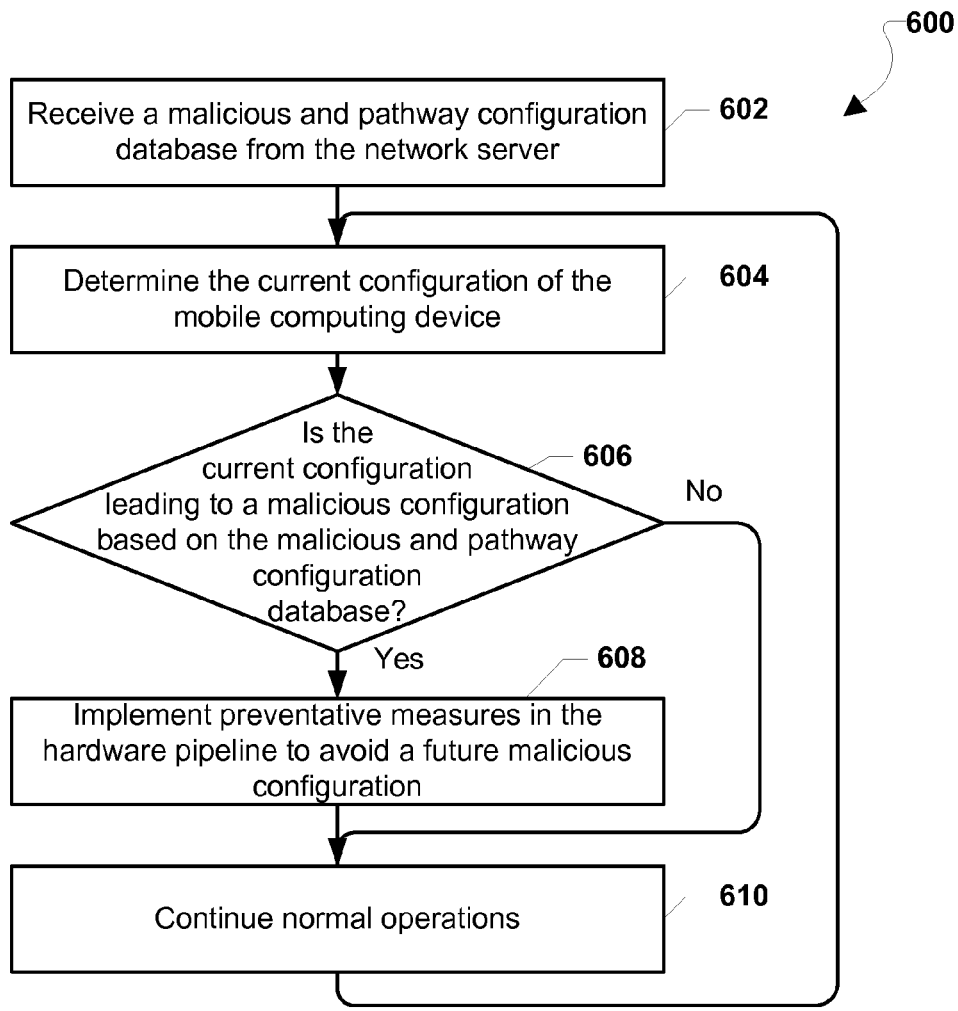
FIG. 6 is a process flow diagram illustrating an aspect method for predicting and implementing preventative measures in a hardware pipeline to avoid a malicious configuration on a mobile computing device.

FIG. 6 illustrates an aspect method 600 that may be implemented by a mobile computing device for preemptively identifying malicious configurations. In an aspect, the mobile computing device may utilize a malicious and pathway configuration database that identifies malicious configurations and pathways configurations to determine when the state of the mobile computing device (or the current configuration of an application, process, or component of the mobile computing device) could lead to malicious behaviors. Based on that determination, the mobile computing device may implement various measures to avoid or prevent such malicious activity.

In block 602, the mobile computing device may receive a malicious and pathway configuration database from the network server. As discussed above in block 518 of method 500 described with reference to FIG. 5, the network server may use crowd-sourced configuration information and/or configuration histories to identify certain configurations that have a risk of leading to some form of malicious behavior reported by other mobile computing devices. The network server may compile information regarding malicious and pathway configurations into a malicious and pathway configuration database and may send one or more malicious and pathway configuration databases to the mobile computing device. In a further aspect, the mobile computing device may routinely receive the malicious and pathway configuration databases as part of a periodic service that the network service manages (e.g., the mobile computing device may register with the network server to receive malicious and pathway configuration databases).

In block 604, the mobile computing device may determine the current configuration of the mobile computing device. As described above with reference to FIG. 2, in an aspect, a behavior observer unit 202 may collect various types of information regarding the current operations/status/state of the mobile computing device (i.e., "behavior observations"), as well as the configuration or state changes the mobile computing device has undergone. For example, the behavior observer unit 202 may determine that the mobile computing device is now in an idle state and that the mobile computing device was most recently in an active state and actively transmitting image data.

In an aspect, the mobile computing device may reference a behavior vector to ascertain the mobile computing device's current configuration. In another aspect, a behavior analyzer unit 204 operating on the mobile computing device may receive the behavior observations from the behavior observer unit 202, and the behavior analyzer unit 204 may use the behavior observations to generate a behavior vector or another indication of the mobile computing device's current configuration. For example, the behavior analyzer unit 204 may determine that the mobile computing device's current configuration indicates that data is being transmitting and that the screen is off. The behavior analyzer unit 204 may conduct finite-state analysis using the behavior observations, such that the behavior analyzer unit may determine the mobile computing device's current configuration by following a series of state transitions to the current state (i.e., current configuration).

In determination block 606, the mobile computing device may determine whether a current configuration could lead to a malicious configuration based on the malicious and pathway configuration database. In other words, the mobile computing device may determine whether its current configuration is a pathway configuration. In an aspect, a behavior analyzer unit 204 and/or a classifier unit 208 may compare the mobile computing device's current configuration (e.g., a behavior vector representing the mobile computing device's current configuration) to the pathway configurations and malicious configurations included in the malicious and pathway configuration database received from the network server to determine whether the current configuration matches a pathway configuration included in the malicious and pathway configuration database.

When the mobile computing device determines that the current configuration is not leading to a malicious configuration based on the malicious and pathway configuration database (i.e., determination block 606="No"), the mobile computing device may continue performing normally in block 610. The process may continue in loop as the mobile computing device may continue by determining the current configuration of the mobile computing device in block 604. Thus, in an aspect, the mobile computing device may continually check its current configuration to make sure it is not at risk of future malicious behavior.

When the mobile computing device determines that the current configuration could lead to a malicious configuration based on the malicious and pathway configuration database (i.e., determination block 606="Yes"), the mobile computing device may implement preventative measures in the hardware pipeline to avoid a future malicious configuration in block 608. In an aspect, the behavior analyzer unit 204 may instruct a control unit 210 to access the mobile computing device's hardware pipeline and pass the instructions stored in the hardware pipeline to a behavior analyzer unit for a determination of whether further action is needed to avoid a malicious configuration. Implementing preventative measures in the hardware pipeline is described below in further detail with reference to FIGS. 7A-10.

After implementing preventative measures in the hardware pipeline, the mobile computing device may continue performing normally in block 610. The process may continue in a loop as the analysis engine may continue by determining the current configuration of the mobile computing device in block 604.

While the above description pertains to determining whether a mobile computing device's current configuration could lead to a malicious configuration, in further aspects, the mobile computing device or a component operating on the mobile computing device may instead determine whether the current configurations of an individual hardware or software component operating on the mobile computing device could lead to a malicious configuration. For example, the mobile computing device may determine that an application's current configuration is a pathway configuration that leads to a malicious configuration. In these alternative aspects, the malicious and pathway configuration database received from the network server may include information regarding malicious and pathway configurations necessary for the mobile computing device (or a component operating the mobile computing device) to determine whether individual applications or hardware components are at risk of malicious behavior in the near future.

Figure 7A:
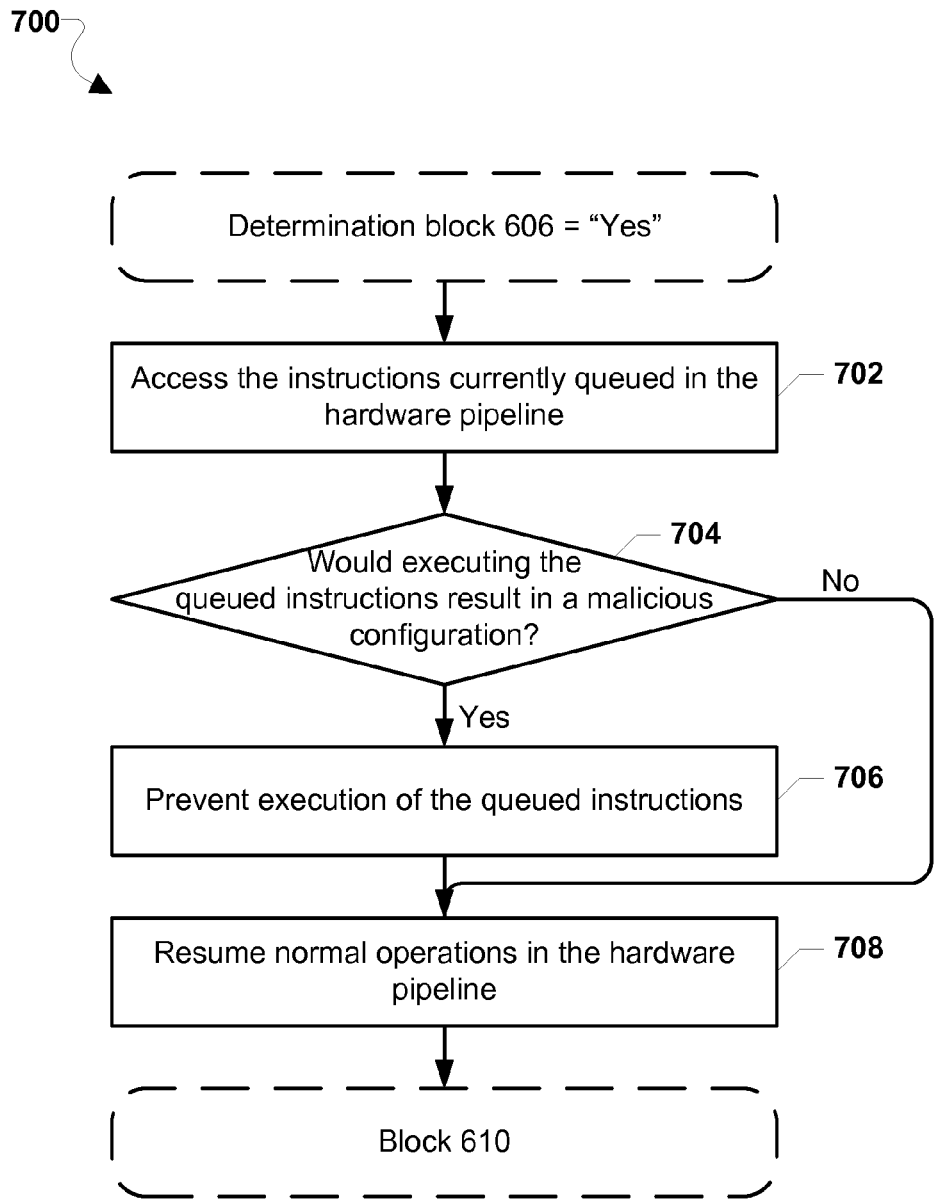
FIG. 7A is a process flow diagram illustrating an aspect method for preventing execution of instructions included in a hardware pipeline when executing the instructions could result in a malicious configuration.

FIG. 7A illustrates an aspect method 700 that may be implemented on a mobile computing device for preventing execution of instructions in a hardware pipeline when executing the queued instructions could result in malicious behavior.

In block 702, the control unit may access the instructions currently queued in the hardware pipeline. For example, as described above with reference to FIG. 4, the control unit may access the instructions included in the hardware pipeline at addresses received from a pre-address decoder, and the control unit may pass these instructions to a behavior analyzer unit.

In determination block 704, the behavior analyzer unit may determine whether executing the queued instructions could result in a malicious configuration. For example, the behavior analyzer unit may generate an expected configuration and compare the expected configuration to a list of known malicious configurations as further described below with reference to FIG. 7B. When the mobile computing device determines that executing the queued instructions would not result in a malicious configuration (i.e., determination block 704="No"), the mobile computing device may resume normal operations in the hardware pipeline in block 708.

When the mobile computing device determines that executing the queued instructions could result in a malicious configuration (i.e., determination block 704="Yes"), the mobile computing device may prevent execution of the queued instructions in block 706. In an aspect, in response to determining that the queued instructions will cause malicious behavior, the behavior analyzer unit may instruct the control unit to perform various operations to prevent the execution of the queued instructions. In an aspect, the control unit may be instructed to purge the hardware pipeline (e.g., replace the queued instructions with "no-op" instructions). In another aspect, the behavior analyzer unit may instruct the control unit to modify the queued instruction to remove the malicious aspects of the queued instructions. In other words, the control unit may convert the queued instructions into benign instructions without completely purging them from the hardware pipeline. For example, the control unit may modify the queued instructions to act on a data part of memory (i.e., a benign operation) rather than acting on an instruction part of memory (i.e., a malicious operation).

In block 708, the mobile computing device may resume normal operations in the hardware pipeline.

In an optional aspect, the various components operating on the mobile computing device may begin performing method 700 in response to determining that the mobile computing device's current configuration is a pathway configuration and thus leading to a malicious configuration (i.e., determination block 606="Yes" in FIG. 6). In response to making this determination, the behavior analyzer unit may signal the control unit, and the control unit may begin accessing the instructions currently queued in the hardware pipeline in block 702 in response to receiving the signal from a behavior analyzer unit. Additionally, after resuming normal operations in the hardware pipeline in block 708, the mobile computing device may continue performing in block 610 of method 600 described above with reference to FIG. 6 by continuing normal operations on the mobile computing device as a whole.

Thus, in such an optional aspect, the various components operating on the mobile computing device may not perform the operations of method 700 until the mobile computing device's current configuration is determined to be leading toward a malicious configuration. In other words, before the mobile computing device invests considerable time and computational resources to determine whether executing instructions in the hardware pipeline will cause malicious behavior, the mobile computing device may make a predetermination that there is some risk of malicious behavior that justifies the costs of investigating the instructions in the hardware pipeline (i.e., determination block 606="Yes").

Figure 7B:
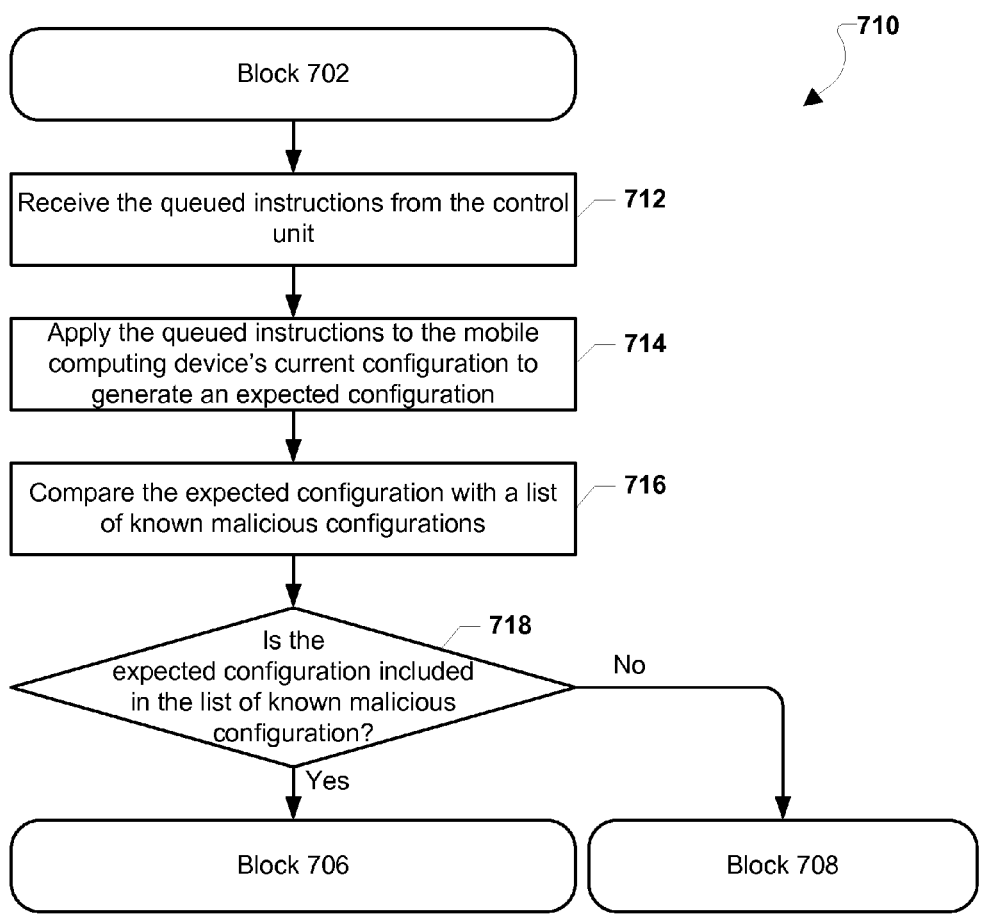
FIG. 7B is a process flow diagram illustrating an aspect method for determining whether executing queued instructions in a hardware pipeline could result in a malicious configuration.

FIG. 7B illustrates an aspect method 710 that may be implemented by a behavior analyzer unit operating on a mobile computing device for determining whether executing instructions in a hardware pipeline will cause malicious behavior. The operations of method 710 implement an aspect of the operations of block 706 of method 700 described above with reference to FIG. 7A.

In block 712, the behavior analyzer unit may receive the queued instructions from the control unit. For example, the control unit may send a copy of the queued instructions to the behavior analyzer unit. In another example, the control unit may only send the memory addresses of the queued instructions to the behavior analyzer unit.

In block 714, the behavior analyzer unit may apply the queued instructions to the mobile computing device's current configuration to generate an expected configuration. As described above, the expected configuration may represent the configuration of the mobile computing device after the queued instructions are executed. For example, the mobile computing device's current configuration may be "screen off, camera on," and the mobile computing device's expected configuration after executing the queued instructions may be "screen off, camera on, transmitting camera data," which may be a configuration in which the mobile computing device is spying on the user (i.e., a malicious configuration).

In block 716, the behavior analyzer unit may compare the expected configuration with a list of known malicious configurations. For example, the list of malicious configurations may be included in a malicious and pathway configuration database received from a network server as described above with reference to FIG. 5.

In determination block 718, the behavior analyzer unit may determine whether the expected configuration is included in the list of known malicious configurations. When the behavior analyzer unit determines that the expected configuration is not included in the list of known malicious configurations (i.e., determination block 718="No"), the control unit may resume normal operations in the hardware pipeline in block 708 of method 700 as described above with reference to FIG. 7A.

When the behavior analyzer unit determines that the expected configuration is included in the list of known malicious configurations (i.e., determination block 718="Yes"), the behavior analyzer unit may signal the control unit to begin preventing the execution of the queued instructions in block 706 of method 700 as described above with reference to FIG. 7A.

Figure 8A:
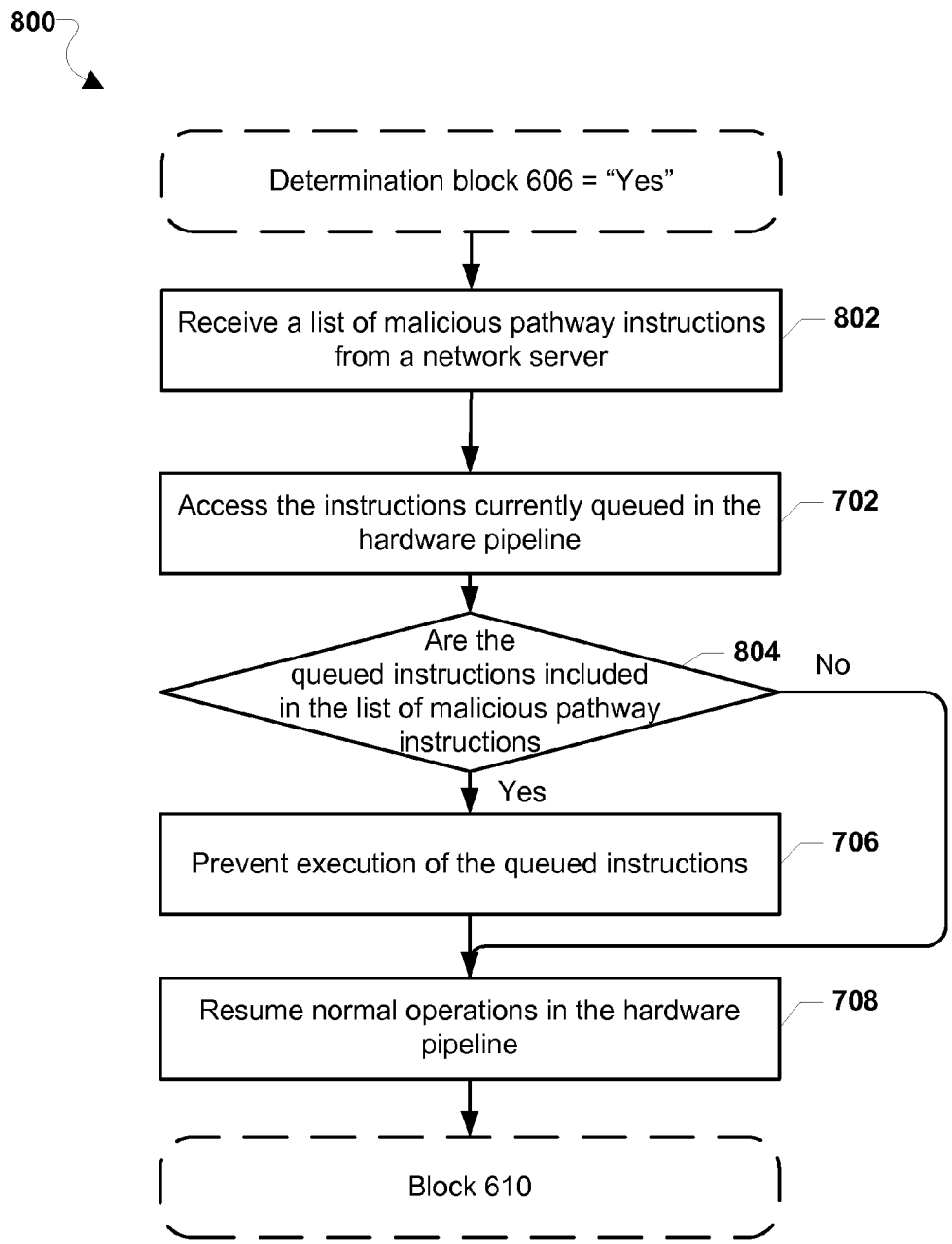
FIG. 8A is a process flow diagram illustrating an aspect method for preventing execution of instructions included in a hardware pipeline when the instructions are included in a list of malicious pathway instructions.

FIG. 8A illustrates an aspect method 800 that may be implemented on a mobile computing device for preventing execution of instructions in a hardware pipeline when the instructions included in the hardware pipeline are included in a list of known malicious pathway instructions.

In block 802, the behavior analyzer unit may receive a list of malicious pathway instructions from a network server. As described above with reference to FIG. 5, the network server may compile a list of malicious pathway instructions from reports received from multiple mobile computing devices that have detected on-going malicious behavior. In a further aspect, the network server may maintain and update the list of malicious pathway instructions and may periodically send an updated list of malicious pathway instructions to the mobile computing device.

As described above with reference to FIG. 7, the control unit may access the instructions currently queued in the hardware pipeline in block 702. In an aspect, the control unit may be responding to a request from the behavior analyzer unit.

In determination block 804, the behavior analyzer unit may determine whether the queued instructions are included in the list of malicious pathway instructions. For example, the queued instructions may be instructions to begin recording audio and transmitting the audio to a third party, which may be included in the list of malicious pathway instructions because other mobile computing devices determined that these instructions configure the mobile computing device to spy on the mobile computing device's user. When the behavior analyzer unit determines that the queued instructions are not included in the list of malicious pathway instructions (i.e., determination block 804="No"), the control unit may resume normal operations in the hardware pipeline in block 708.

When the behavior analyzer unit determines that executing the queued instructions could result in a malicious configuration (i.e., determination block 804="Yes"), the control unit may prevent execution of the queued instructions in block 706 as described above with reference to FIG. 7. For example, the behavior analyzer unit may instruction the control unit to purge the instruction queue, block the execution of the queued instructions, or modify the queued instructions to make sure the queued instructions cannot cause malicious behavior. In block 708, the control unit may resume normal operations in the hardware pipeline.

In an optional aspect, the various components operating on the mobile computing device may begin performing method 800 in response to determining that the mobile computing device's current configuration is a pathway configuration and thus leading to a malicious configuration (i.e., determination block 606="Yes" in FIG. 6). In response to making this determination, the behavior analyzer unit may signal the control unit, and the control unit may begin accessing the instructions currently queued in the hardware pipeline in block 702 in response to receiving the signal from a behavior analyzer unit. Additionally, after resuming normal operations in the hardware pipeline in block 708, the mobile computing device may continue performing in block 610 of method 600 described above with reference to FIG. 6 by continuing normal operations on the mobile computing device.

Figure 8B:
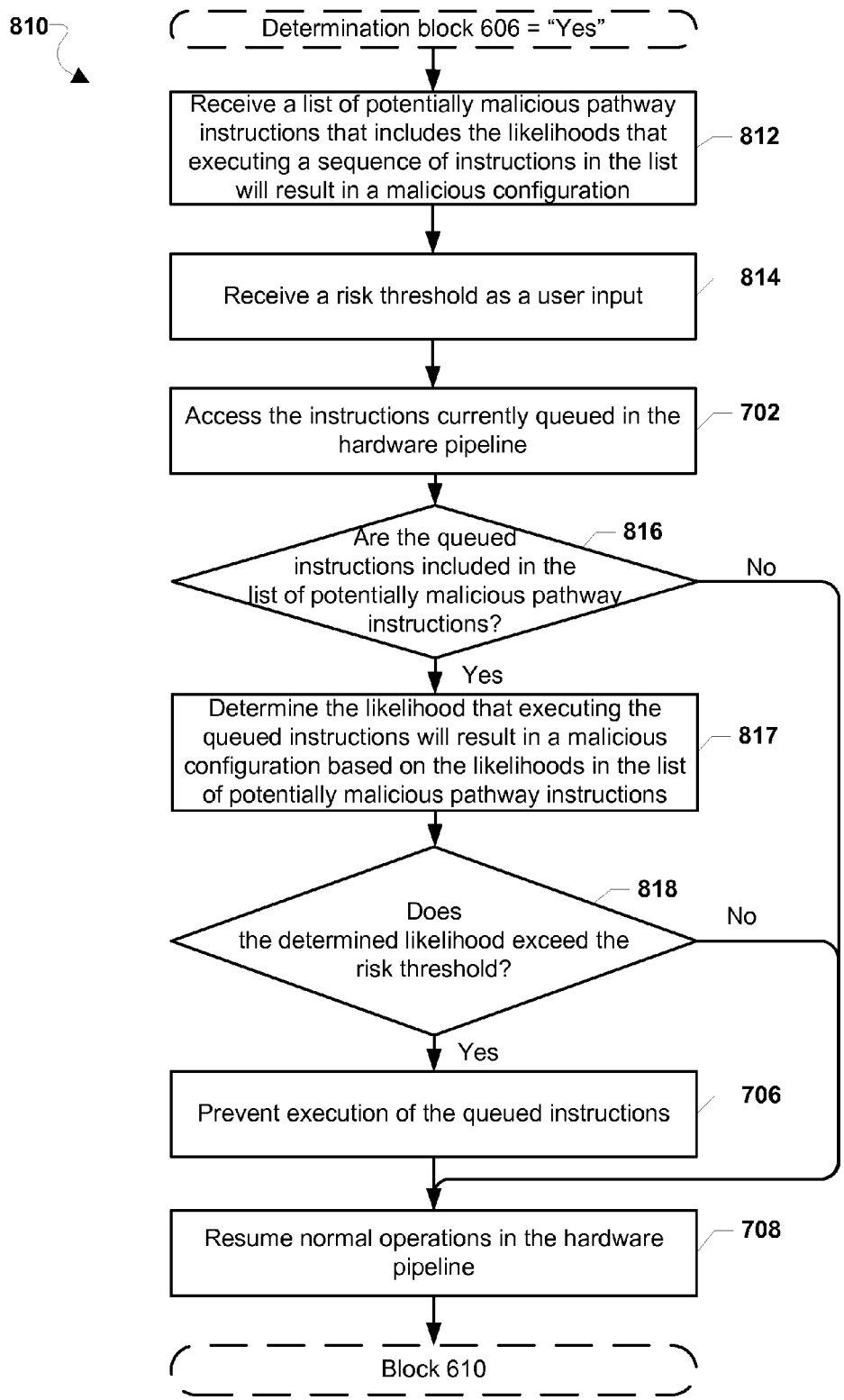
FIG. 8B is a process flow diagram illustrating an aspect method for preventing execution of instructions included in a hardware pipeline when a likelihood that executing the queued instructions will cause malicious behavior exceeds a risk threshold.

FIG. 8B illustrates an aspect method 810 that may be implemented on a mobile computing device for preventing execution of queued instructions in a hardware pipeline when the likelihood that executing the queued instructions will result in a malicious configuration exceeds a user-defined risk threshold.

In block 812, the behavior analyzer unit may receive a list of potentially malicious pathway instructions, the list including likelihoods that executing sequences of instructions in the list will result in a malicious configuration. In an aspect, potentially malicious pathway instructions may be malicious pathway configurations that result in malicious configurations only under certain conditions or when executed only a certain percentage of the time. In another aspect, the network server may have received information from multiple mobile computing devices (as described above with reference to FIG. 5) revealing that a certain percentage of mobile computing devices executing particular sequences of instructions have experienced malicious behavior on. Based on this information, the network server may identify those particular sequences of instructions as having the potential to cause malicious behavior when executed and determine a likelihood that executing those instructions will result in a malicious configuration. The network server may send to a plurality of mobile devices a list of identified potentially malicious pathway configurations and their associated likelihoods of causing malicious behavior when executed. As further described below, a behavior analyzer unit operating on a mobile computing device may utilize the list of potentially malicious pathway instructions when determining whether to instruct the control unit to prevent the execution of instructions queued in the hardware pipeline that match instructions in the list.

In an aspect, after receiving the list of potentially malicious pathway instructions, the behavior analyzer unit in the mobile device may be unable to definitely determine whether particular instructions queued in the hardware pipeline will cause malicious behavior because the list only includes the probability or likelihood that executing certain sequences of instructions will cause malicious when executed behavior. Given this uncertainty, the behavior analyzer unit may be required to balance competing goals of security and performance. For example, the behavior analyzer unit may achieve better performance on the mobile computing device (i.e., fewer interruptions in the hardware pipeline) by only blocking execution of queued instructions that have a high likelihood of causing or leading to a malicious configuration. On the other hand, the behavior analyzer unit may make the mobile computing device more secure (i.e., may do a better job preventing malicious behavior) by blocking queued instructions that have any likelihood of resulting in a malicious configuration when executed.

To govern the tradeoff between security and performance, the behavior analyzer unit may receive a risk threshold as a manufacturer, security provider, system provider, system administrator, and/or user input in block 814, such as an input received from a user interface device (e.g., keyboard, touchscreen, etc.). In an aspect, the risk threshold may reflect a user's (or a third-party security provider's) security-to-performance preference. For example, a user or system administrator at an intelligence agency may desire a higher level security to ensure that all the malicious instructions are caught and inhibited, in which case the mobile device may be configured so that the behavior analyzer unit uses a low likelihood threshold. On the other hand, another user may decide that stopping every malicious behavior is not worth the performance impact, and may configure the behavior analyzer unit to implement preventative measures only when there is a high likelihood that executing instructions queued in the hardware pipeline will cause malicious behavior.

As described above with reference to FIG. 7, the control unit may access the instructions currently queued in the hardware pipeline in block 702. In determination block 816, the behavior analyzer unit may determine whether the queued instructions are included in the list of potentially malicious pathway instructions. When the behavior analyzer unit determines that the queued instructions are not included in the list of potentially malicious pathway instructions (i.e., determination block 816="No"), the control unit may resume normal operations in the hardware pipeline in block 708.

When the behavior analyzer unit determines that the queued instructions are included in the list of potentially malicious pathway instructions (i.e., determination block 816="Yes"), the behavior analyzer unit may determine the likelihood that executing the queued instructions will result in a malicious configuration based on the likelihoods included in the list of potentially malicious pathway instructions in block 817. This operation may involve looking up a likelihood value included with the received list of suspect instruction, such as by performing a table look up.

The behavior analyzer unit may determine whether the likelihood value assigned or associated with the queued instructions exceeds the risk threshold in determination block 818. In this operation, the behavior analyzer unit may compare the likelihood value obtained in block 817 with the risk threshold set by the user. When the behavior analyzer unit determines that the value assigned or associated with the queued instructions does not exceed the risk threshold (i.e., determination block 818="No"), the control unit may resume normal operations in the hardware pipeline in block 708.

When the behavior analyzer unit determines that the value assigned or associated with the queued instructions exceeds the risk threshold (i.e., determination block 818="Yes"), the unit may prevent execution of the queued instructions in block 706 as described above with reference to FIG. 7. In block 708, the control unit may resume normal operations in the hardware pipeline.

In an optional aspect, the various components operating on the mobile computing device may begin performing method 810 in response to determining that the mobile computing device's current configuration is a pathway configuration and thus has the potential of leading to a malicious configuration (i.e., determination block 606="Yes" in FIG. 6). Additionally, after resuming normal operations in the hardware pipeline in block 708, the mobile computing device may continue normal operations in block 610 as described above with reference to FIG. 6.

Figure 9:
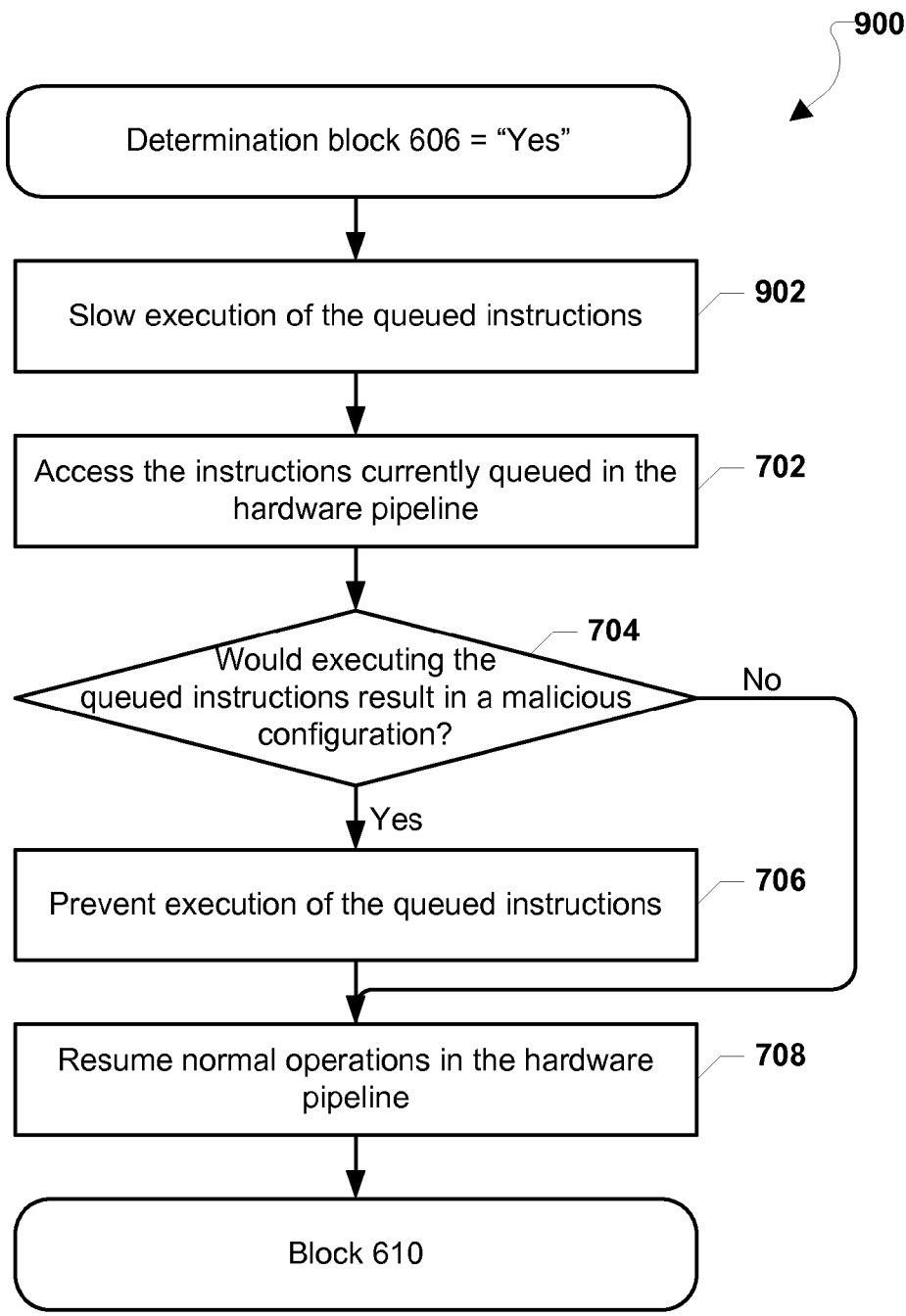
FIG. 9 is a process flow diagram illustrating an aspect method for slowing execution of instructions included in a hardware pipeline before determining whether executing the queued instructions could result in a malicious configuration.

FIG. 9 illustrates an aspect method 900 that may be implemented by components operating on a mobile computing device for slowing execution of instructions included in a hardware pipeline to facilitate determining whether executing the instructions in a hardware pipeline will cause malicious behavior. The operations of method 900 implement an aspect of block 608 of method 600 described above with reference to FIG. 6. Thus, in an aspect, the components operating on the mobile computing device may begin performing method 900 after determining that the mobile computing device's current configuration could lead to malicious behavior (i.e., determination block 606="Yes").

In block 902, the control unit may slow execution of the queued instructions. Because queued instructions are processed through the hardware pipeline rapidly (e.g., within milliseconds), it may be necessary for the control unit to adjust the speed in which those instructions are processed for the behavior analyzer unit to have sufficient time to investigate the possibility that those queues instructions are malicious.

In a further aspect, the control unit may only slow the execution of queued instructions when there is a reasonable likelihood that malicious behavior may occur in the near future, such as when the mobile computing device's current configuration is a pathway configuration (i.e., determination block 606="Yes"). In other words, the instructions in the hardware pipeline may process at a normal speed until the behavior analyzer unit determines that the mobile computing device is in a pathway configuration because slowing execution of the queued instructions may have a substantial impact on the overall performance of the mobile computing device. Thus, slowing execution of the queued instructions may occur only when the potential likelihood of future malicious behavior is sufficiently justified, such as when the mobile computing device's current configuration is determined to be leading to malicious behavior.

In another aspect in which the mobile computing device includes multiple processors or one or more multicore processors, the control unit may only slow the execution of instructions for processors that are about to execute instructions that are leading the mobile computing device to malicious behavior. For example, the behavior analyzer unit may determine that an application's current configuration is a pathway configuration based on a malicious and pathway configuration database received from a network server, and the control unit may slow the processor that is about to execute instructions related to that process. Thus, the control unit may cause only a minimal impact on the mobile computing device's overall performance while still ensuring protection against future malicious behavior.

In block 702, the control unit may access the instructions currently queued in the hardware pipeline. For example, as described above with reference to FIG. 4, the control unit may access the instructions included in the hardware pipeline at addresses received from a pre-address decoder, and the control unit may pass these instructions to a behavior analyzer unit.

In determination block 704, the behavior analyzer unit may determine whether executing the queued instructions could result in a malicious configuration as described above with reference to FIG. 7. In an aspect, the behavior analyzer unit may have sufficient time to determine whether executing the queued instructions could result in a malicious configuration because the control unit may have slowed the speed of execution for the queued instructions to facilitate the behavior analyzer unit's determination. When the behavior analyzer unit determines that executing the queued instructions would not result in a malicious configuration (i.e., determination block 704="No"), the control unit may resume normal operations in the hardware pipeline in block 708 as described below.

When the behavior analyzer unit determines that executing the queued instructions could result in a malicious configuration (i.e., determination block 704="Yes"), the control unit may prevent execution of the queued instructions in block 706. In an aspect, in response to determining that the queued instructions will cause malicious behavior, the behavior analyzer unit may instruct the control unit to purge the hardware pipeline (e.g., replacing the queued instructions with "no-op" instructions) or modify the queued instruction to remove the malicious aspects of the queued instructions.

In block 708, the control unit may resume normal operations in the hardware pipeline. In an aspect, the control unit may resume the normal execution speed of instructions in the hardware pipeline. The behavior analyzer unit may continue performing in block 610 of method 600 described above with reference to FIG. 6 by continuing normal operations on the mobile computing device.

Figure 10:
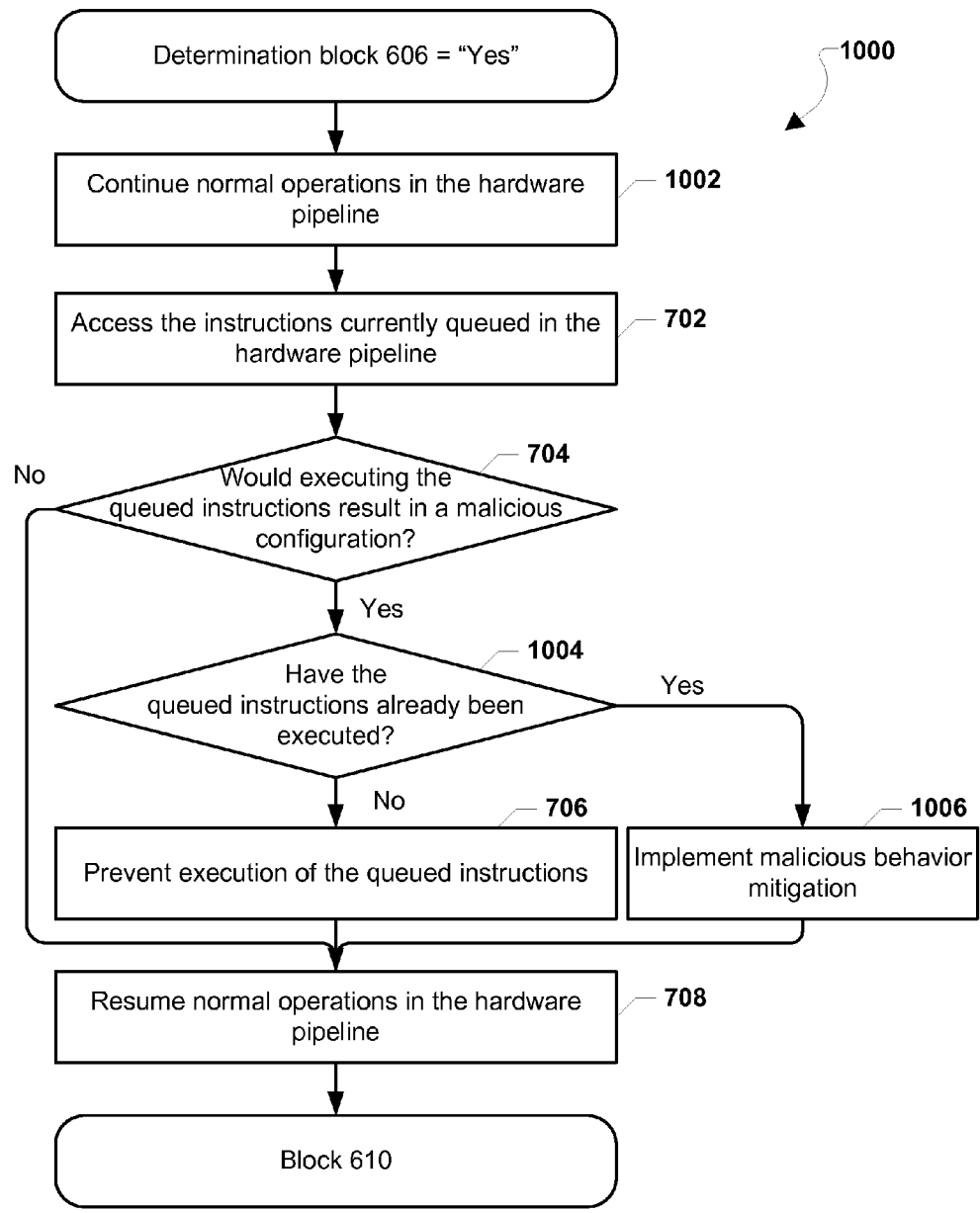
FIG. 10 is a process flow diagram illustrating an aspect method for attempting to prevent the execution of malicious pathway instructions and implementing malicious behavior mitigation strategies when the malicious pathway instructions have already been executed.

FIG. 10 illustrated an aspect method 1000 that may be implemented by components operating on a mobile computing device for using best efforts to prevent execution of malicious pathway instructions in a hardware pipeline without slowing execution of the instructions included in the hardware pipeline. The operations of method 1000 implement an aspect of block 608 of method 600 described above with reference to FIG. 6. Thus, in an aspect, the mobile computing device components may begin performing method 1000 after determining that the mobile computing device's current configuration could lead to malicious behavior (i.e., determination block 606="Yes").

In block 1002, the control unit may continue normal operations in the hardware pipeline. In other words, the control unit may not modify the normal execution of instructions even though the behavior analyzer unit has determined that the mobile computing device's current configuration could lead to malicious behavior. Instead, the control unit and behavior analyzer unit may employ best efforts to detect and prevent execution of malicious pathway instructions.

In block 702, the control unit may access the instructions currently queued in the hardware pipeline as described above with reference to FIG. 7.

In determination block 704, the behavior analyzer unit may determine whether executing those queues instructions could result in a malicious configuration. For example, the behavior analyzer unit may receive the instructions queued in the hardware pipeline, and the behavior analyzer unit may apply the queued instructions to the mobile computing device's current configuration to generate an expected configuration. The behavior analyzer unit may then determine whether the expected configuration is included in a list of malicious configurations included in a malicious and pathway configuration database received from the network server.

When the behavior analyzer unit determines that executing the queued instructions would not result in a malicious configuration (i.e., determination block 704="No"), the control unit may resume normal operations in the hardware pipeline in block 708. In an aspect, the control unit may cease inspecting the instructions included in the hardware pipeline.

When the behavior analyzer unit determines that executing the queued instructions could result in a malicious configuration (i.e., determination block 704="Yes"), the control unit may determine whether the queued instructions have already been executed in determination block 1004. In an aspect, given the short amount of time needed to process the queued instructions, the queued instructions may have already been executed by the time the control unit accesses the queued instructions and passes them to the behavior analyzer unit and by the time the behavior analyzer unit receives the queued instructions and determines whether executing the queued instructions could result in malicious behavior.

When the control unit determines that the queues instructions have not already been executed (i.e., determination block 1004="No"), the control unit may prevent execution of the queued instructions in block 706. For example, the control unit may purge the hardware pipeline or modify the queued instructions to make them benign.

When the control unit determines that the queued instructions have already been executed (i.e., determination block 1004="Yes"), the behavior analyzer unit may implement malicious behavior mitigation in block 1006. In an aspect, because malicious behavior may have begun to occur after the queued instructions were executed, the behavior analyzer unit may begin taking various steps necessary to identify and halt such malicious behavior. For example, the behavior analyzer unit may alert an actuator unit (not shown) of malicious behavior, and the actuator unit may terminate, quarantine, repair, or otherwise cure malicious processes or applications using generally known techniques.

In an aspect, because the behavior analyzer unit begins determining whether the queued instructions will cause malicious behavior before the queued instructions are executed, the behavior analyzer may have a head start in determining that malicious behavior is currently occurring. Thus, the malicious behavior may be stopped sooner than contemporary solutions.

After either implementing malicious behavior mitigation in block 1006 or preventing execution of the queued instructions in block 706, the control may resume normal operations in the hardware pipeline in block 708 as described above with reference to FIG. 7. The behavior analyzer unit may continue performing in block 610 of method 600 described above with reference to FIG. 6 by resuming normal operations on the mobile computing device.

Figure 11:
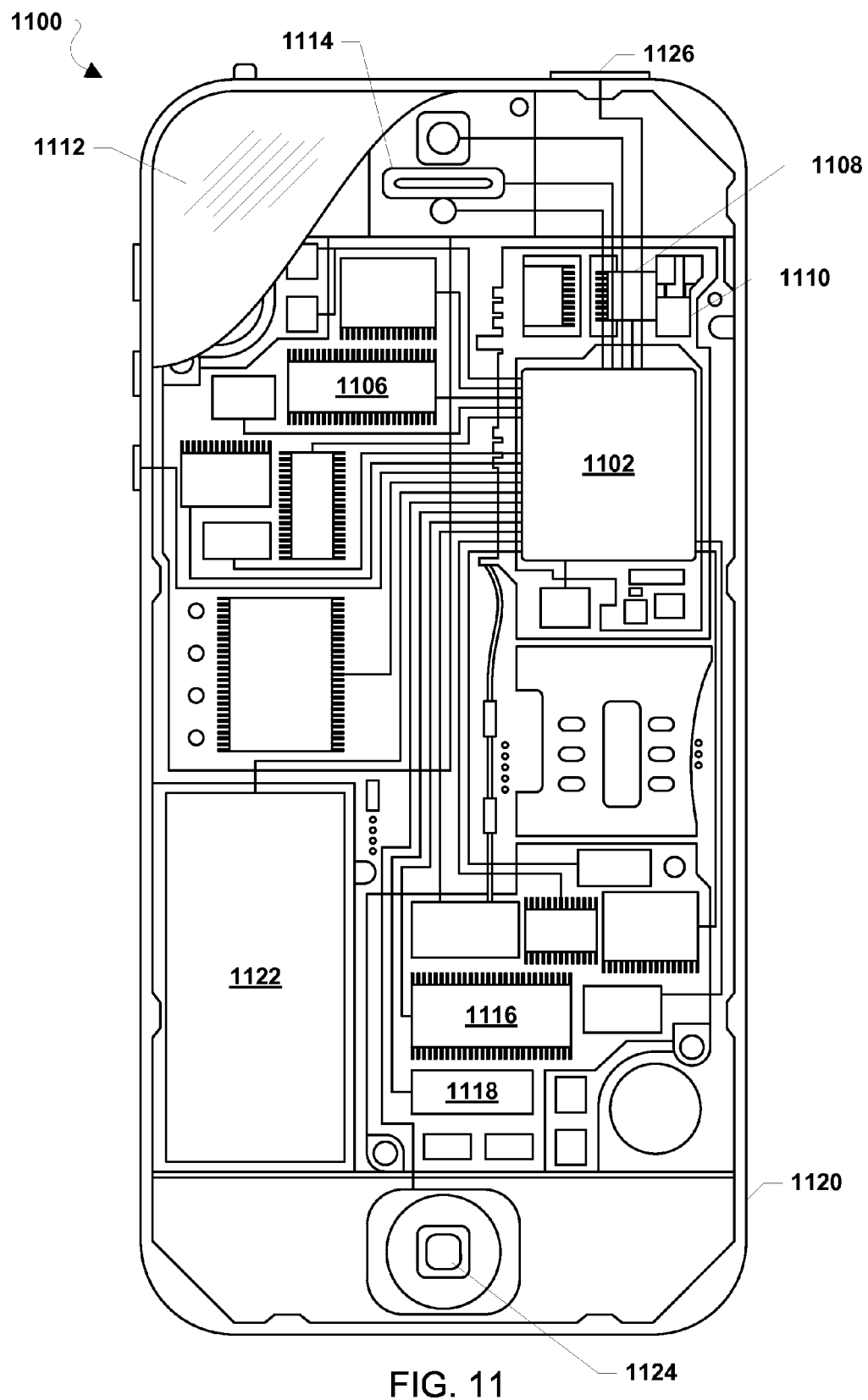
FIG. 11 is a component block diagram of a mobile computing device suitable for use in an aspect.

The various aspects may be implemented in any of a variety of mobile computing devices, an example of which is illustrated in FIG. 11. The mobile computing device 1100 may include a processor 1102 coupled to an internal memory 1106. The processor 1102 may be one or more multicore integrated circuits designated for general or specific processing tasks. The internal memory 1106 may be volatile or non-volatile memory, and may also be secure and/or encrypted memory, or unsecure and/or unencrypted memory, or any combination thereof. The processor 1102 may also be coupled to a touchscreen panel 1112, such as a resistive-sensing touchscreen, capacitive-sensing touchscreen, infrared sensing touchscreen, etc. Additionally, the display of the mobile computing device 1100 need not have touch screen capability.

The mobile computing device 1100 may have one or more radio signal transceivers 1108 (e.g., Peanut®, Bluetooth®, Zigbee®, Wi-Fi, RF radio) and antennae 1110, for sending and receiving communications, coupled to each other and/or to the processor 1102. The transceivers 1108 and antennae 1110 may be used with the above-mentioned circuitry to implement the various wireless transmission protocol stacks and interfaces. The mobile computing device 1100 may include a cellular network wireless modem chip 1116 that enables communication via a cellular network and is coupled to the processor.

The mobile computing device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as USB, FireWire, Thunderbolt, or PCIe. The peripheral device connection interface 1118 may also be coupled to a similarly configured peripheral device connection port (not shown).

The mobile computing device 1100 may also include speakers 1114 for providing audio outputs. The mobile computing device 1100 may also include a housing 1120, constructed of a plastic, metal, or a combination of materials, for containing all or some of the components discussed herein. The mobile computing device 1100 may include a power source 1122 coupled to the processor 1102, such as a disposable or rechargeable battery. The rechargeable battery may also be coupled to the peripheral device connection port to receive a charging current from a source external to the mobile computing device 1100. The mobile computing device 1100 may also include a physical button 1124 for receiving user inputs. The mobile computing device 1100 may also include a power button 1126 for turning the mobile computing device 1100 on and off.

Figure 12:
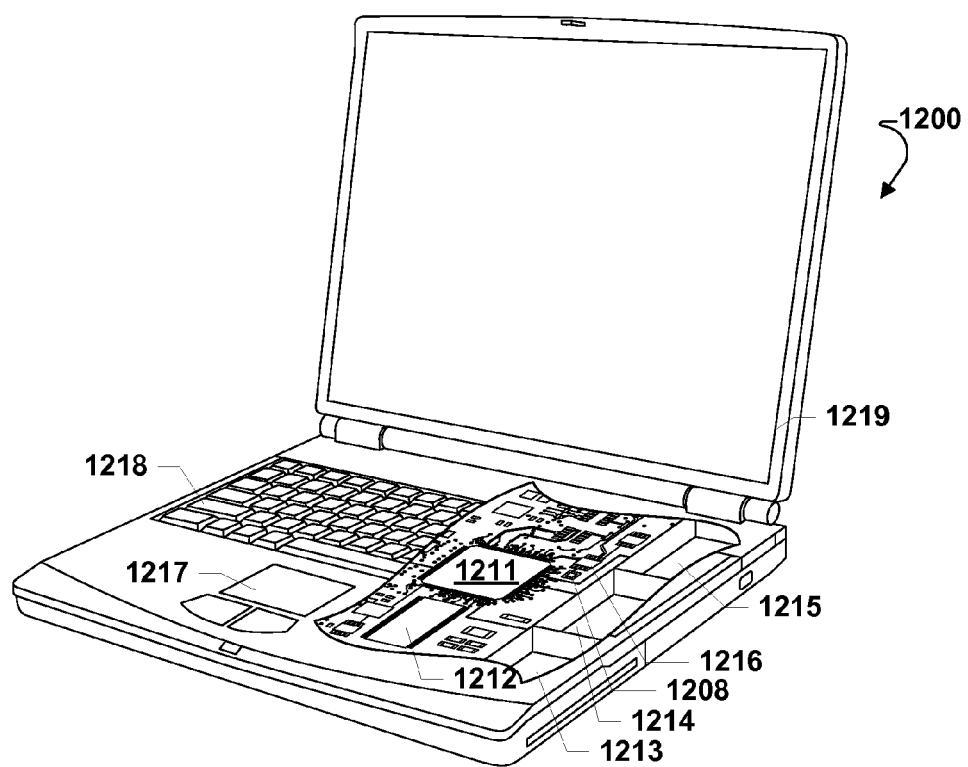
FIG. 12 is a component block diagram of another mobile computing device suitable for use in an aspect.

The various aspects described above may also be implemented within a variety of mobile computing devices, such as a laptop computer 1200 illustrated in FIG. 12. Many laptop computers include a touchpad touch surface 1217 that serves as the computer's pointing device, and thus may receive drag, scroll, and flick gestures similar to those implemented on mobile computing devices equipped with a touch screen display and described above. A laptop computer 1200 will typically include a processor 1211 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the processor 1211. The computer 1200 may also include a floppy disc drive 1214 and a compact disc (CD) drive 1215 coupled to the processor 1211. In a notebook configuration, the computer housing includes the touchpad 1217, the keyboard 1218, and the display 1219 all coupled to the processor 1211. Other configurations of the computing device may include a computer mouse or trackball coupled to the processor (e.g., via a USB input) as are well known, which may also be use in conjunction with the various aspects.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of monitoring queued hardware instructions to protect operations of a wireless device that includes a hardware pipeline, comprising:
    accessing instructions currently queued in the hardware pipeline ("queued instructions");
    receiving a list of potentially malicious pathway instructions from a network server, the received list of potentially malicious pathway instructions including one or more likelihood values associated with one or more of the queued instructions;
    determining, during pendency of the queued instructions in the hardware pipeline and based on the one or more likelihood values included in the received list of potentially malicious pathway instructions, a probability value that identifies a probability that executing the queued instructions will result in a malicious configuration;
    determining at runtime whether the probability value exceeds a risk threshold value; and
    preventing execution of the queued instructions in response to determining that the probability value exceeds the risk threshold value.

2. The method of claim 1, wherein preventing execution of the queued instructions comprises purging the queued instructions from the hardware pipeline.

3. The method of claim 1, wherein preventing execution of the queued instructions comprises modifying the queued instructions.

4. The method of claim 1, wherein receiving the list of potentially malicious pathway instructions from the network server comprises receiving a malicious and pathway configuration database from the network server, the malicious and pathway configuration database including the list of potentially malicious pathway instructions.

5. The method of claim 4, further comprising:
    determining a current configuration of the wireless device; and
    determining whether the current configuration of the wireless device could lead to the malicious configuration based on the malicious and pathway configuration database received from the network server.

6. The method of claim 5, wherein operations of determining, during pendency of the queued instructions in the hardware pipeline and based on the one or more likelihood values included in the received list of potentially malicious pathway instructions, the probability value that identifies the probability that executing the queued instructions will result in the malicious configuration, determining at runtime whether the probability value exceeds the risk threshold value are performed, and preventing execution of the queued instructions are performed in response to determining that the current configuration of the wireless device could lead to the malicious configuration based on the malicious and pathway configuration database received from the network server.

7. The method of claim 1, wherein accessing instructions currently queued in the hardware pipeline comprises:
    slowing execution of the queued instructions; and
    accessing the queued instructions after slowing execution of the queued instructions.

8. A wireless device, comprising:
a memory;
a hardware pipeline coupled to the memory; and
a processor coupled to the memory and the hardware pipeline, wherein the processor is configured with processor-executable instructions to:
   access instructions currently queued in the hardware pipeline ("queued instructions");
   receive a list of potentially malicious pathway instructions from a network server, the received list of potentially malicious pathway instructions including one or more likelihood values associated with one or more of the queued instructions;
   determine, during pendency of the queued instructions in the hardware pipeline and based on the one or more likelihood values included in the received list of potentially malicious pathway instructions, a probability value that identifies a probability that executing the queued instructions will result in a malicious configuration;
   determine at runtime whether the probability value exceeds a risk threshold value; and
   prevent execution of the queued instructions in response to determining that the probability value exceeds the risk threshold value.

9. The wireless device of claim 8, wherein the processor is configured with processor-executable instructions to prevent execution of the queued instructions by purging the queued instructions from the hardware pipeline.

10. The wireless device of claim 8, wherein the processor is configured with processor-executable instructions to prevent execution of the queued instructions by modifying the queued instructions.

11. The wireless device of claim 8, wherein the processor is configured with processor-executable instructions to receive the list of potentially malicious pathway instructions from the network server by receiving a malicious and pathway configuration database from the network server, the malicious and pathway configuration database including the list of potentially malicious pathway instructions.

12. The wireless device of claim 11, wherein the processor is further configured with processor-executable instructions to:
   determine a current configuration of the wireless device; and
   determine whether the current configuration of the wireless device could lead to the malicious configuration based on the malicious and pathway configuration database received from the network server.

13. The wireless device of claim 12, wherein the processor is configured with processor-executable instructions to determine, during pendency of the queued instructions in the hardware pipeline and based on the one or more likelihood values included in the received list of potentially malicious pathway instructions, the probability value that identifies the probability that executing the queued instructions will result in the malicious configuration, determine at runtime whether the probability value exceeds the risk threshold value are performed, and prevent execution of the queued instructions are performed in response to determining that the current configuration of the wireless device could lead to the malicious configuration based on the malicious and pathway configuration database received from the network server.

14. The wireless device of claim 8, wherein the processor is further configured with processor-executable instructions to access instructions currently queued in the hardware pipeline by:
   slowing execution of the queued instructions; and
   accessing the queued instructions after slowing execution of the queued instructions.

15. A wireless device, comprising:
   means for accessing instructions currently queued in a hardware pipeline ("queued instructions");
   means for receiving a list of potentially malicious pathway instructions from a network server, the received list of potentially malicious pathway instructions including one or more likelihood values associated with one or more of the queued instructions;
   means for determining, during pendency of the queued instructions in the hardware pipeline and based on the one or more likelihood values included in the received list of potentially malicious pathway instructions, a probability value that identifies a probability that executing the queued instructions will result in a malicious configuration;
   means for determining at runtime whether the probability value exceeds a risk threshold value; and
   means for preventing execution of the queued instructions in response to determining that the probability value exceeds the risk threshold value.

16. The wireless device of claim 15, wherein means for preventing execution of the queued instructions comprises means for purging the queued instructions from the hardware pipeline.

17. The wireless device of claim 15, wherein means for preventing execution of the queued instructions comprises means for modifying the queued instructions.

18. The wireless device of claim 15, wherein means for receiving the list of potentially malicious pathway instructions from the network server comprises means for receiving a malicious and pathway configuration database from the network server, the malicious and pathway configuration database including the list of potentially malicious pathway instructions.

19. The wireless device of claim 18, further comprising:
   means for determining a current configuration of the wireless device; and
   means for determining whether the current configuration of the wireless device could lead to the malicious configuration based on the malicious and pathway configuration database received from the network server.

20. The wireless device of claim 19, wherein determining, during pendency of the queued instructions in the hardware pipeline and based on the one or more likelihood values included in the received list of potentially malicious pathway instructions, the probability value that identifies the probability that executing the queued instructions will result in the malicious configuration, determining at runtime whether the probability value exceeds the risk threshold value are performed, and preventing execution of the queued instructions are performed in response to determining that the current configuration of the wireless device could lead to the malicious configuration based on the malicious and pathway configuration database received from the network server.

21. The wireless device of claim 15, wherein means for accessing the queued instructions comprises:
   means for slowing execution of the queued instructions; and
   means for accessing the queued instructions after slowing execution of the queued instructions.

22. A non-transitory processor-readable storage medium having stored thereon processor-executable instructions configured to cause a processor in a wireless device to perform operations comprising:

accessing instructions currently queued in a hardware pipeline ("queued instructions");

receiving a list of potentially malicious pathway instructions from a network server, the received list of potentially malicious pathway instructions including one or more likelihood values associated with one or more of the queued instructions;

determining, during pendency of the queued instructions in the hardware pipeline and based on the one or more likelihood values included in the received list of potentially malicious pathway instructions, a probability value that identifies a probability that executing the queued instructions will result in a malicious configuration;

determining at runtime whether the probability value exceeds a risk threshold value; and preventing execution of the queued instructions in response to determining that the probability value exceeds the risk threshold value.

23. The non-transitory processor-readable storage medium of claim 22, wherein the stored processor-executable instructions are configured to cause the processor to perform operations such that preventing execution of the queued instructions comprises purging the queued instructions from the hardware pipeline.

24. The non-transitory processor-readable storage medium of claim 22, wherein the stored processor-executable instructions are configured to cause the processor to perform operations such that preventing execution of the queued instructions comprises modifying the queued instructions.

25. The non-transitory processor-readable storage medium of claim 22, wherein the stored processor-executable instructions are configured to cause the processor to perform operations such that receiving the list of potentially malicious pathway instructions from the network server comprises receiving a malicious and pathway configuration database from the network server, the malicious and pathway configuration database including the list of potentially malicious pathway instructions.

26. The non-transitory processor-readable storage medium of claim 25, wherein the stored processor-executable instructions are configured to cause the processor to perform operations further comprising:

determining a current configuration of the wireless device; and determining whether the current configuration of the wireless device could lead to the malicious configuration based on the malicious and pathway configuration database received from the network server.

27. The non-transitory processor-readable storage medium of claim 26, wherein the stored processor-executable instructions are configured to cause the processor to perform operations such that the operations of determining, during pendency of the queued instructions in the hardware pipeline and based on the one or more likelihood values included in the received list of potentially malicious pathway instructions, the probability value that identifies the probability that executing the queued instructions will result in the malicious configuration, determining at runtime whether the probability value exceeds the risk threshold value are performed, and preventing execution of the queued instructions are performed in response to determining that the current configuration of the wireless device could lead to the malicious configuration based on the malicious and pathway configuration database received from the network server.

28. The non-transitory processor-readable storage medium of claim 22, wherein the stored processor-executable instructions are configured to cause the processor to perform operations such that accessing the queued instructions comprises:

slowing execution of the queued instructions; and accessing the queued instructions after slowing execution of the queued instructions.

\* \* \* \* \*